(12) United States Patent
Luo et al.

(10) Patent No.: US 11,509,191 B2
(45) Date of Patent: Nov. 22, 2022

(54) ELECTRIC ASSEMBLY AND VEHICLE HAVING THE SAME

(71) Applicant: BYD COMPANY LIMITED, Shenzhen (CN)

(72) Inventors: Hongbin Luo, Shenzhen (CN); Yi Ren, Shenzhen (CN); Guangquan Chen, Shenzhen (CN); Daqi Chen, Shenzhen (CN); Shuanghong Jing, Shenzhen (CN); Chunlei Liu, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 183 days.

(21) Appl. No.: 16/969,342

(22) PCT Filed: Jan. 28, 2019

(86) PCT No.: PCT/CN2019/073414
§ 371 (c)(1),
(2) Date: Aug. 12, 2020

(87) PCT Pub. No.: WO2019/154155
PCT Pub. Date: Aug. 15, 2019

(65) Prior Publication Data
US 2020/0403482 A1 Dec. 24, 2020

(30) Foreign Application Priority Data

Feb. 12, 2018 (CN) .......................... 201810146436.X
Feb. 12, 2018 (CN) .......................... 201820260597.7

(51) Int. Cl.
| | | |
|---|---|---|
| *H02K 5/04* | (2006.01) | |
| *H02K 7/116* | (2006.01) | |
| *H02K 11/30* | (2016.01) | |
| *B60K 1/00* | (2006.01) | |
| *B60K 17/04* | (2006.01) | |
| *H02K 3/50* | (2006.01) | |
| *H02K 5/18* | (2006.01) | |
| *H02K 5/22* | (2006.01) | |

(Continued)

(52) U.S. Cl.
CPC ................ *H02K 7/116* (2013.01); *B60K 1/00* (2013.01); *B60K 17/04* (2013.01); *H02K 3/50* (2013.01);
(Continued)

(58) Field of Classification Search
CPC .......... H02K 5/04; H02K 5/225; H02K 7/116; H02K 9/19; H02K 9/193; H02K 11/30
See application file for complete search history.

(56) References Cited

U.S. PATENT DOCUMENTS 5,166,677 A * 11/1992 Schoenberg ........ E21B 33/0355
340/853.3
6,700,255 B1 * 3/2004 Stenta .................. H02K 5/1672
310/90

(Continued)

FOREIGN PATENT DOCUMENTS

| CN | 102774279 A | 11/2012 |
|---|---|---|
| CN | 202629021 U | 12/2012 |

(Continued)

OTHER PUBLICATIONS

The World Intellectual Property Organization (WIPO) International Search Report for PCT/CN2019/073414 dated Feb. 22, 2019 7 Pages.

*Primary Examiner* — Dang D Le
(74) *Attorney, Agent, or Firm* — Anova Law Group, PLLC

(57) ABSTRACT

The present disclosure discloses an electric assembly and a vehicle having the same. The electric assembly includes: a box assembly; a motor, disposed in the box assembly; a transmission, disposed in the box assembly, where the transmission is power-coupled to the motor; and a controller, disposed outside the box assembly, and fixedly connected to the box assembly.

17 Claims, 26 Drawing Sheets

(51) Int. Cl.
  *H02K 7/00*    (2006.01)
  *H02K 9/193*   (2006.01)
  *H02K 5/20*    (2006.01)
  *B60K 11/02*   (2006.01)

(52) U.S. Cl.
  CPC ............... *H02K 5/18* (2013.01); *H02K 5/203* (2021.01); *H02K 5/225* (2013.01); *H02K 7/006* (2013.01); *H02K 9/193* (2013.01); *H02K 11/30* (2016.01); *B60K 11/02* (2013.01)

(56) References Cited

U.S. PATENT DOCUMENTS

2004/0108778 A1* 6/2004 Tsukamoto ............ H02K 11/33
                                                    310/71
2007/0034427 A1    2/2007  Janson et al.
2016/0020657 A1    1/2016  Hattori et al.

FOREIGN PATENT DOCUMENTS

| | | |
|---|---|---|
| CN | 103542062 A      | 1/2014 |
| CN | 206475745 U      | 9/2017 |
| CN | 107650675 A      | 2/2018 |
| CN | 208190393 U      | 12/2018 |
| DE | 112014001112 T5  | 12/2015 |
| DE | 102015217441 A1  | 3/2016 |
| DE | 112015006071 T5  | 10/2017 |
| JP | 2005224077 A     | 8/2005 |
| WO | 2013069774 A1    | 5/2013 |
| WO | 2014125856 A1    | 8/2014 |
| WO | 2016006361 A1    | 1/2016 |
| WO | 2016110519 A1    | 7/2016 |
| WO | 2017054687 A1    | 4/2017 |

\* cited by examiner

ELECTRIC ASSEMBLY AND VEHICLE HAVING THE SAME

CROSS-REFERENCE TO RELATED APPLICATIONS

This application is a national phase entry under 35 U.S.C. §371 of International Application No. PCT/CN2019/073414, filed on Jan. 28, 2019, which is based on and claims priority to Chinese Patent Applications Nos. 201810146436.X and 201820260597.7, filed both on Feb. 12, 2018, contents of all of which are incorporated herein by reference in their entireties.

FIELD

This application relates to the field of vehicle manufacturing technologies and, specifically, to an electric assembly and a vehicle having the electric assembly.

BACKGROUND

A motor assembly, a transmission assembly and a controller assembly individually disposed are used in a vehicle in the related art. The motor assembly is connected to the transmission assembly through a bolt, and the controller assembly is connected to the motor assembly in a three-phase line manner. Boxes at connection locations have relatively large wall thicknesses and waste space, there are many and bulky components, the loss is high, each assembly occupies a relatively large space, the structure is insufficiently compact, mounting and maintenance are difficult, costs are relative relatively high, and the entire mass is large, which affects the endurance capability of the entire vehicle.

SUMMARY

The present disclosure aims to resolve at least one of the technical problems existing in the prior art. For this purpose, the present disclosure proposes an electric assembly, where the electric assembly has advantages such as a compact structure and a strong applicability.

The present disclosure further provides a vehicle having the electric assembly.

To achieve the foregoing objective, according to an embodiment of a first aspect of the present disclosure, an electric assembly is proposed. The electric assembly includes: a box assembly; a motor, where the motor is disposed in the box assembly; a transmission, where the transmission is disposed in the box assembly, and the transmission is power-coupled to the motor; and a controller, where the controller is disposed outside the box assembly and fixedly connected to the box assembly.

Additionally, the electric assembly according to the foregoing embodiment of the present disclosure may further have the following additional technical characteristics:

According to an embodiment of the present disclosure, the electric assembly further includes a conductive sheet, where the conductive sheet is configured to connect the controller and the motor.

According to another embodiment of the present disclosure, the electric assembly further includes a conductive sheet, where the conductive sheet is stuck in the controller or the conductive sheet is fixed to the controller through a bolt.

According to another embodiment of the present disclosure, the controller is located above the box assembly.

According to an embodiment of the present disclosure, a height-to-width ratio of the electric assembly ranges from 0.6 to 0.9.

According to an embodiment of the present disclosure, an upper surface of the box assembly is in contact with a lower surface of the controller, and the lower surface of the controller is fixed onto the box assembly through a bolt.

According to another embodiment of the present disclosure, the transmission and the motor jointly define a folded space, a half shaft of the transmission stretches out to the folded space, and the controller is mounted above the half shaft.

According to an embodiment of the present disclosure, an end portion of the half shaft is provided with a ball cage, the controller is located above the ball cage, and the controller is not in contact with the ball cage.

According to another embodiment of the present disclosure, the controller and the motor are mounted on a same side or two sides of the transmission.

According to an embodiment of the present disclosure, a mounting plate is disposed in the box assembly, the mounting plate divides a space within the box assembly into a motor holding cavity and a transmission holding cavity that are arranged along an axial direction of a motor shaft, the mounting plate has a shaft via-hole making the motor holding cavity and the transmission holding cavity be in communication with each other, and the motor is power-coupled to the transmission.

According to an embodiment of the present disclosure, the controller has a housing, the housing includes a cover plate and a base, the cover plate and the base jointly define a cavity, and a surface of the cover plate is provided with a protruding portion.

According to an embodiment of the present disclosure, the protruding portion is located in the center of the cover plate.

According to an embodiment of the present disclosure, a surface of the cover plate is provided with a plurality of cover plate reinforcing ribs, and each of the cover plate reinforcing ribs extends to the periphery of the cover plate along the center of the protruding portion.

According to an embodiment of the present disclosure, bosses are disposed in the centers of two opposite side edges of the protruding portion.

According to an embodiment of the present disclosure, there are a plurality of boss reinforcing ribs on each of the bosses, and each of the boss reinforcing ribs extends to the periphery of the cover plate along the center of the boss.

According to an embodiment of the present disclosure, a side of the mounting plate facing the motor is provided with ribs.

According to an embodiment of the present disclosure, the ribs divide a space between the mounting plate and the motor into a plurality of cavities.

According to an embodiment of the present disclosure, a maximum distance between the motor and the mounting plate is less than a preset distance.

According to an embodiment of the present disclosure, the ribs include an annular rib extending along a circumferential direction of the motor.

According to an embodiment of the present disclosure, the ribs include strip-shaped ribs extending along a radial direction of the motor, there are a plurality of strip-shaped ribs and the plurality of strip-shaped ribs are spaced apart along a circumferential direction of the mounting plate.

According to an embodiment of the present disclosure, heights of the strip-shaped ribs relative to the mounting plate gradually decrease from inside to outside.

According to an embodiment of the present disclosure, the box assembly includes a transmission box and a motor box, the transmission box includes a front box and a rear box, the motor box includes a motor housing and a motor backend cover, the front box and the motor housing are disposed adjacent to each other, and the mounting plate is constructed as a part of the front box or a part of the motor housing.

According to an embodiment of the present disclosure, the front box and the motor housing are integrally formed or detachably connected.

According to an embodiment of the present disclosure, the box assembly includes a transmission box and a motor box, the transmission box includes a front box and a rear box, the motor box includes a motor frontend cover, a motor housing and a motor backend cover, and the mounting plate is constructed as a part of the front box or a part of the motor frontend cover.

According to an embodiment of the present disclosure, the motor housing, the motor frontend cover and the front box are integrally formed or each two of the motor housing, the motor frontend cover and the front box are detachably connected.

According to an embodiment of the present disclosure, the motor frontend cover and the front box are integrally formed, and the motor housing and the motor frontend cover are detachably connected.

According to an embodiment of the present disclosure, the motor frontend cover and the motor housing are integrally formed, and the motor frontend cover and the front box are detachably connected.

According to an embodiment of the present disclosure, one or more of a first connection rib, a second connection rib and a third connection rib are connected between an outer surface of the front box and an outer surface of the motor housing, the first connection rib is connected between an upper end face of the motor housing and an upper end face of the front box, the second connection rib is connected between a lower end face of the motor housing and a lower end face of the front box, and the third connection rib is located between the first connection rib and the second connection rib.

According to an embodiment of the present disclosure, the transmission includes a main shaft, the main shaft is power-coupled to a motor shaft of the motor, at least one of the motor shaft and the main shaft is threaded through a shaft via-hole and is connected to the other one, and the main shaft is connected to the motor shaft of the motor through splines.

According to an embodiment of the present disclosure, the main shaft is provided with a shaft hole, an inner circumferential surface of the shaft hole is provided with inner splines, an outer circumferential surface of the motor shaft is provided with outer splines, the motor shaft of the motor is matched in the shaft hole and the inner splines match the outer splines.

According to an embodiment of the present disclosure, the shaft hole runs through the main shaft along an axial direction of the main shaft, an oil baffle is matched in the shaft hole, the oil baffle, an inner circumferential wall of the shaft hole and the motor shaft jointly define an oil storage cavity, the oil storage cavity is filled with lubricating oil, and the oil baffle is provided with an air vent.

According to an embodiment of the present disclosure, a seal retainer ring is matched between the oil baffle and the shaft hole and between the outer circumferential surface of the motor shaft and the inner circumferential surface of the shaft hole.

According to an embodiment of the present disclosure, an outer surface of the motor housing is provided with reinforcing ribs arranged along the outer surface of the motor housing.

According to an embodiment of a second aspect of the present disclosure, a vehicle is proposed. The vehicle includes the electric assembly according to the embodiment of the first aspect of the present disclosure.

In the vehicle according to this embodiment of the present disclosure, the electric assembly according to the embodiment of the first aspect of the present disclosure is used, where the electric assembly has advantages such as a compact structure and a strong applicability.

The additional aspects and advantages of the present disclosure will be provided in the following description, and some of the additional aspects and advantages will become clear in the following description or be understood through practice of the present disclosure.

BRIEF DESCRIPTION OF THE DRAWINGS

The foregoing and/or additional aspects and advantages of the present disclosure become more obvious and easily understood in descriptions of the embodiments with reference to the following accompanying drawings.

Figure 1:
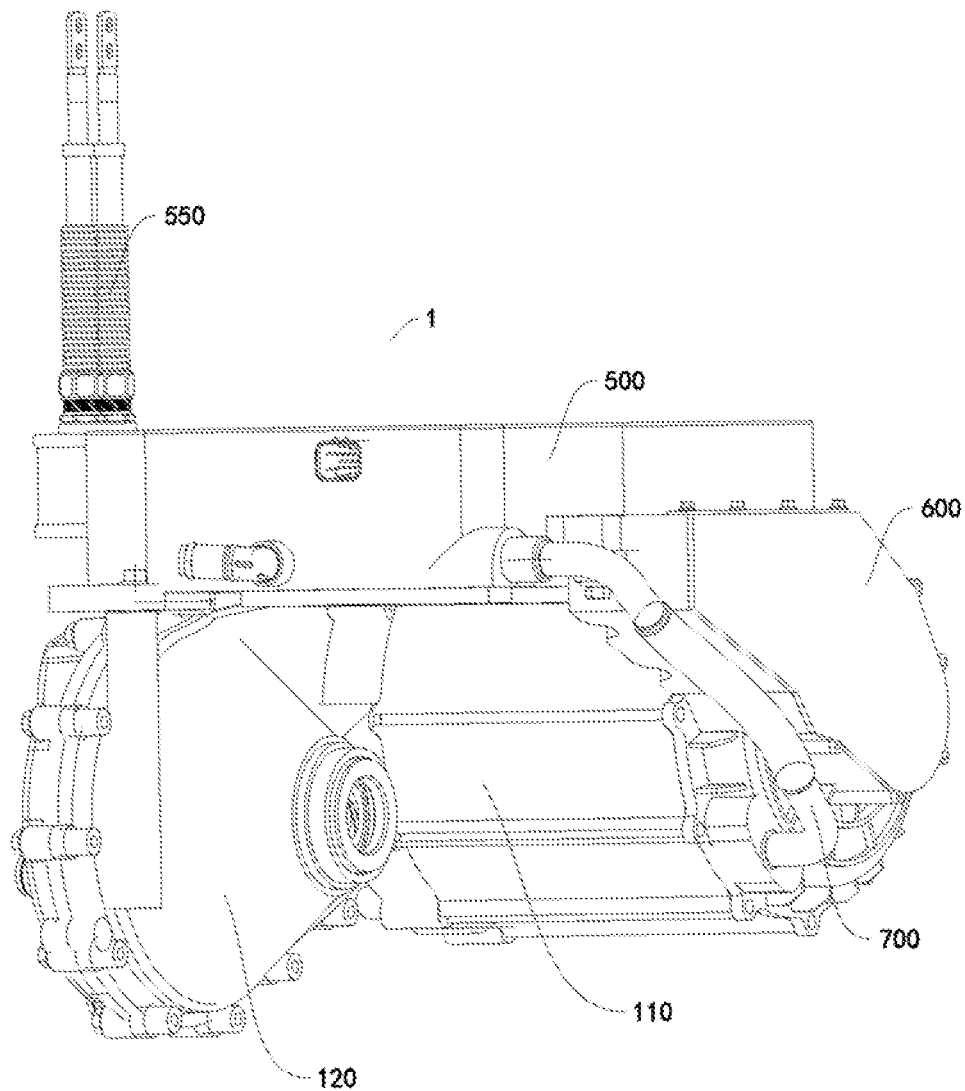
FIG. 1 is a schematic structural diagram of an electric assembly according to an embodiment of the present disclosure.
Figure 2:
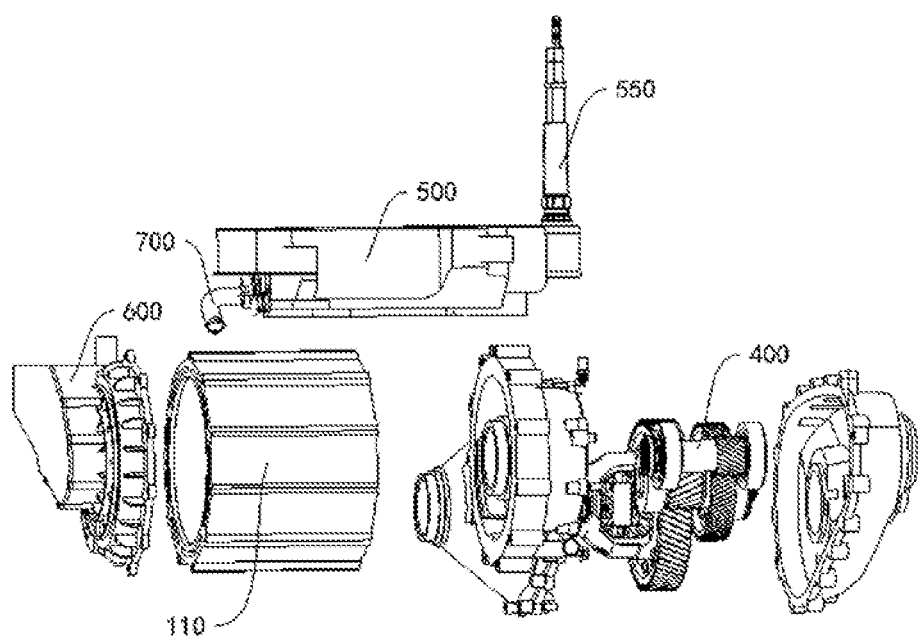
FIG. 2 is an exploded view of an electric assembly according to an embodiment of the present disclosure.

Reference numerals of the accompanying drawing: electric assembly 1; box assembly 100; transmission box 101; motor box 102; motor segment 110; speed change segment 120; shaft via-hole 130; water cooling outlet 140; motor backend cover 150; mounting plate 160; motor water inlet 170; motor 200; motor shaft 210; main shaft 300; shaft hole 310; oil baffle 320; oil storage cavity 330; seal retainer ring 340; air vent 350; transmission 400; first gear 410; second gear 420; third gear 430; differential assembly 440; transmission shaft 450; controller 500; transverse side 510; longitudinal side 520; water cooling inlet 530; controller water outlet 540; direct current bus 550; housing 560; cover plate 561; base 562; protruding portion 563; cover plate reinforcing rib 564; boss 565; boss reinforcing rib 566; seal cavity 600; cavity body 610; cavity cover plate 620; water cooling connection pipe 700; bearing 800; first bearing 810; second bearing 820; third bearing 830; fourth bearing 840; folded space 40; motor body 203; leading wire 2031; connection device 204; supporting plate 205; positioning insert 206; conductive sheet 20; conductive member 10; insertion sheet 2211; motor connection end 2212; first cooling passage 11; first interface 111; second interface 112; second cooling passage 21; third interface 211; fourth interface 212; first seal structure 31; motor waterway inlet connector 13; controller waterway outlet connector 32; cooling water by controller waterway inlet connector 33; motor waterway outlet connector 14; motor holding cavity 103; transmission holding cavity 104; motor housing 105; reinforcing rib 141; front box 180; first connection rib 181; second connection rib 182; third connection rib 183; rear box 190; motor frontend cover 106; lining portion 151; first protrusion 152; lining water channel 153; second protrusion 154; rib 161; cavity 162; annular rib 163; outer splines 211; inner splines 311; vehicle 11.

DETAILED DESCRIPTION

The following describes exemplary embodiments of the present disclosure in detail. Examples of the embodiments are shown in the accompanying drawings. The same or similar elements and the elements having same or similar functions are denoted by like reference numerals throughout the descriptions. The following embodiments described with reference to the accompanying drawings are exemplary, and are only intended to describe the present disclosure and cannot be construed as a limitation to the present disclosure.

An electric assembly 1 according to an embodiment of the present disclosure is described below with reference to the accompanying drawings.

As shown in FIG. 1 to FIG. 32, the electric assembly 1 according to this embodiment of the present disclosure includes a box assembly 100, a motor 200, a transmission 400 and a controller 500.

The motor 200 is disposed in the box assembly 100. The transmission 400 is disposed in the box assembly 100, and the transmission 100 is power-coupled to the motor 200. The controller 500 is disposed outside the box assembly 100, and fixedly connected to the box assembly 100.

In the electric assembly 1 according to this embodiment of the present disclosure, the motor 200 and the transmission 400 are disposed in the box assembly 100, and the controller 500 is mounted outside the box assembly 100, and fixedly connected to the box assembly 100, so that the motor 200, the transmission 400 and the controller 500 may be integrally disposed. Compared with a power assembly in the related art, the motor 200 and the transmission 400 share a box assembly 100, to implement the integrated design of the electric assembly 1, which not only may leave out a structure in which a plurality of box assemblies 100 are disposed, but also may leave out a connection structure between the motor assembly and the transmission assembly, such as a bolt, thereby helping simplify the structure of the electric assembly 1, reducing the part quantity of the electric assembly 1, improving the integration level of the electric assembly 1, and reducing the weight of the electric assembly 1. Additionally, the integrated design facilitates mounting and dismounting, and improves the production efficiency of the electric assembly 1.

Moreover, the motor 200, the transmission 400 and the controller 500 are integrally disposed. Compared with the power assembly in the related art, the motor assembly, the transmission assembly and the controller assembly may be prevented from being individually disposed to waste space, to help shorten an axial distance of the electric assembly 1, so that the structure of the electric assembly 1 is compact and proper, thereby improving the space utilization of the electric assembly 1, and facilitating the disposition of the electric assembly 1; and facilitating mounting and repair of the electric assembly 1, helping improve the applicable range of the electric assembly 1, and helping improve reliability and stability of the electric assembly 1.

Moreover, the motor 200 and the transmission 400 share a box assembly 100, thereby helping reduce the weight of the electric assembly 1. For example, when the electric assembly 1 is applied to a vehicle 11, the entire weight of the vehicle 11 may be reduced, thereby helping reduce costs of the vehicle 11, reducing the energy loss of the vehicle 11, improving the operating efficiency of the vehicle 11, and improving the endurance capability of the vehicle 11.

Further, the motor 200 is power-coupled to the transmission 400, so that the motor 200 and the transmission 400 are in direct transmission, and an additional transmission structure may be left out, to further simplify the structure of the electric assembly 1, and improve the integration level of the electric assembly 1; and help transfer power outputted by the motor 200 to the transmission 400 in time, help improve transmission efficiency of the electric assembly 1, and help improve timeliness and accuracy of power transmission of the electric assembly 1.

Moreover, the controller 500 is mounted on the box assembly 100, and the motor 200, the transmission 400 and the controller 500 are at a high integration level. Compared with a motor assembly in the related art, an external three-phase line disposed between the controller 500 and the motor 200 may be left out, to facilitate optimization of the structure of the electric assembly 1, reduce costs of the electric assembly 1, prevent mounting of the external three-phase line from affecting the seal effect of the electric assembly 1, prevent electric leakage from occurring in the electric assembly 1, improve the operating efficiency of the electric assembly 1, improve the anti-interference capability of the electric assembly 1, and reduce the fault rate of the electric assembly 1.

Therefore, the electric assembly 1 according to this embodiment of the present disclosure has advantages such as a compact structure and a strong applicability.

An electric assembly 1 according to an embodiment of the present disclosure is described below with reference to the accompanying drawings.

In some embodiments of the present disclosure, as shown in FIG. 1 to FIG. 32, the electric assembly 1 according to one embodiment of the present disclosure includes a box assembly 100, a motor 200, a transmission 400 and a controller 500.

According to an embodiment of the present disclosure, the controller 500 and the motor 200 are directly electrically connected. In this way, the structure of the electric assembly 1 is simplified, and the integration level of the electric assembly 1 is improved.

Figure 9:
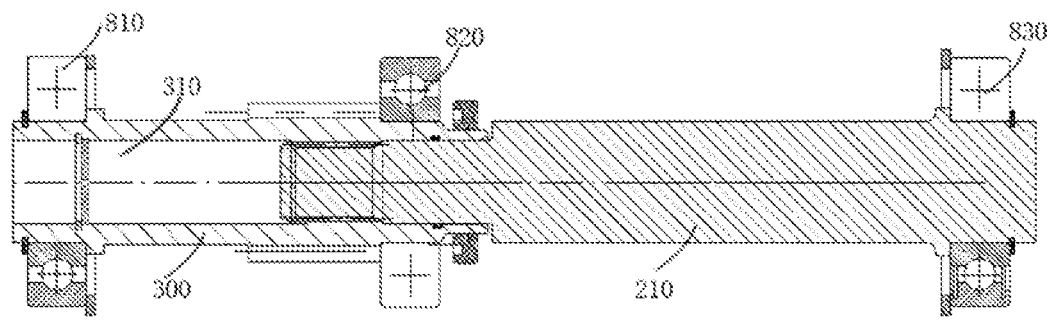
FIG. 9 is a local cross-sectional view of an electric assembly according to another embodiment of the present disclosure.
Figure 10:
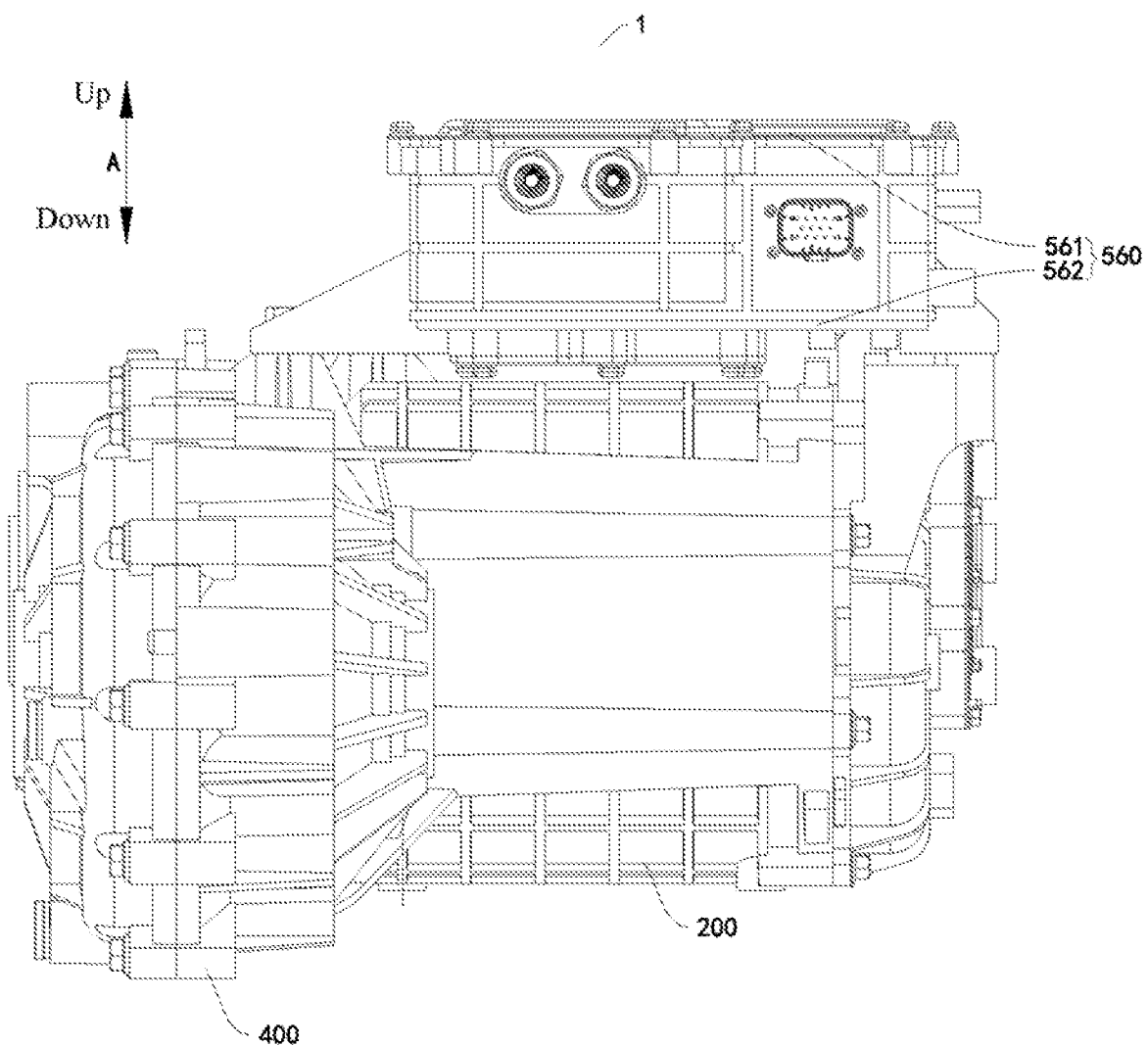
FIG. 10 is a schematic structural diagram of an electric assembly according to another embodiment of the present disclosure.

According to another embodiment of the present disclosure, as shown in FIG. 9, the controller 500 is located above the box assembly (an up-down direction is shown by an arrow A in FIG. 10). In this way, the disposition of the controller 500 is facilitated.

Specifically, as shown in FIG. 9, the controller 500 is located above the motor 200 and the transmission 400. Specifically, the controller 500 may be located above the motor 200 or may be located above the transmission 400, and the motor 200 may be in direct contact with or may not be in contact with the controller 500. For example, the controller 500 is mounted above both the motor 200 and the transmission 400, the transmission 400 is located on a side of the motor 200 in a horizontal direction, the transmission 400 is located on a rear side of the motor 200, and the controller 500 is located above an entirety forming by the transmission 400 and the motor 200.

Figure 11:
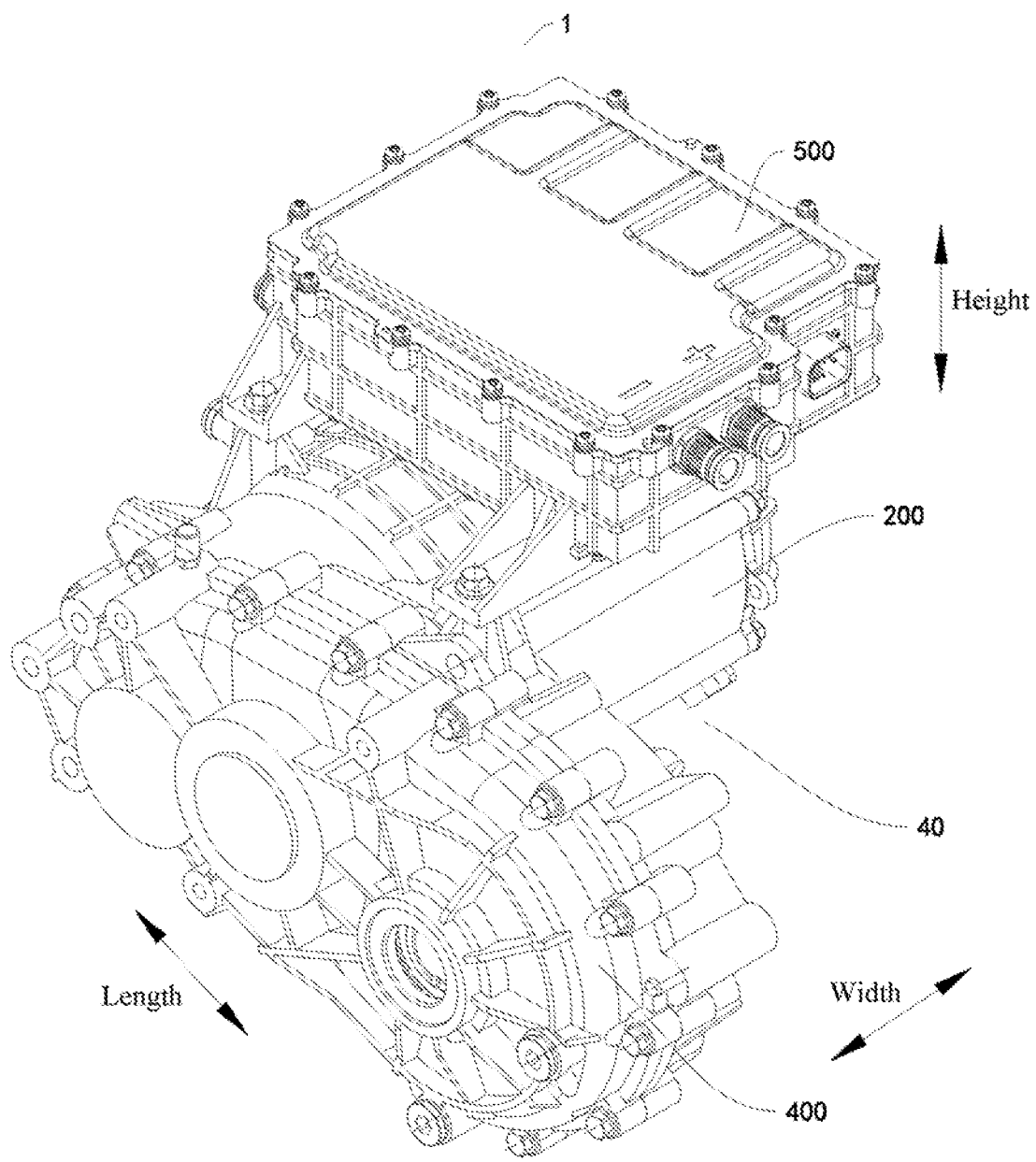
FIG. 11 is a schematic structural diagram of an electric assembly according to another embodiment of the present disclosure.

More specifically, a height-to-width ratio of the electric assembly 1 ranges from 0.6 to 0.9 (a length direction, a width direction and a height direction of the electric assembly 1 are shown in FIG. 11). In this way, when the height-to-width ratio of the electric assembly 1 is a maximum value, the height of the electric assembly 1 may be reduced, and arrangement is performed when the height of the entire vehicle assembly is limited. When the height-to-width ratio is a minimum value, the transverse size may be reduced, and arrangement is performed when the requirement on the transverse size of the entire vehicle assembly is low.

Specifically, the rated output power of the motor 200 is 70 KW, the rated rotational speed of the motor 200 is 14000 r/min, the speed ratio of the transmission 400 is 10.7, the height of the electric assembly 1 ranges from 350 mm to 370 mm, the length of the electric assembly 1 ranges from 410 mm to 430 mm, the width of the electric assembly 1 ranges from 440 mm to 460 mm, and the height of the box assembly 100 ranges from 250 mm to 270 mm.

Specifically, the rated output power of the motor 200 is 70 KW, the rated rotational speed of the motor 200 is 14000 r/min, the speed ratio of the transmission 400 is 8.5, the height of the electric assembly 1 ranges from 350 mm to 370 mm, the length of the electric assembly 1 ranges from 410 mm to 430 mm, the width of the electric assembly 1 ranges from 440 mm to 460 mm, and the height of the box assembly 100 ranges from 250 mm to 270 mm.

More specifically, the rated output power of the motor 200 is 120 KW, the rated rotational speed of the motor 200 is 14000 to 15000 r/min, the speed ratio of the transmission 400 is 9.3, the height of the electric assembly 1 ranges from 320 mm to 340 mm, the length of the electric assembly 1 ranges from 470 mm to 490 mm, the width of the electric assembly 1 ranges from 470 mm to 490 mm, and the height of the box assembly 100 ranges from 230 mm to 250 mm.

Optionally, an upper surface of the box assembly 100 is in contact with a lower surface of the controller 500, and the lower surface of the controller 500 is fixed onto the box assembly 100 through a bolt. In this way, the disposition of the controller 500 is facilitated, to help improve the structure stability of the controller 500.

According to another embodiment of the present disclosure, as shown in FIG. 10, the transmission 500 and the motor 200 jointly define a folded space 40, a half shaft of the transmission 400 stretches out to the folded space 40, and the controller 500 is mounted above the half shaft. Specifically, the motor 200 is mounted on a side of the transmission 400 in the horizontal direction, a transmission shaft (not shown) of the transmission 400 and the motor 200 are connected, the half shaft of the transmission 400 is mounted on a same side as that of the transmission 400 on which the motor 200 is located, the half shaft of the transmission 400 is parallel to an axial direction of the motor 200, the folded space 40 are defined by the motor 200 and the transmission 400, the folded space 40 is located on a side of the motor 200 facing the half shaft of the transmission 400, and the folded space 40 is located on a side of the transmission 400 facing the motor 200.

In one embodiment shown in FIG. 11, the motor 200 is mounted on both the motor 200 and the transmission 400, the controller 500 and the motor 200 are electrically connected, the controller 500 is configured to control starting, stop, the rotational speed and the like of the motor 200, and the controller body is disposed in the folded space 40. It may be understood that, the controller body refers to a function carrying part of the controller 500, that is, a part implementing a control function, but does not include parts such as a mounted support. The controller 500 is disposed on a side of the transmission 400 the same as that of the motor 200, and moreover the controller 500 is disposed on a side of the motor 200 the same as that of the half shaft of the transmission 400. The controller 500, the transmission 400 and the motor 200 are integrated as a whole, which means that the controller 500, the transmission 400 and the motor 200 form an entirety in a structure space. It may be understood that, the controller 500 may be mounted on the box assembly 100 in which the motor 200 and the transmission 400 are integrated, or may be only mounted on the box of the motor 200, or only mounted on the box of the transmission 400.

In the electric assembly 1 according to one embodiment of the present disclosure, the folded space 40 is defined between the transmission 400 and the motor 200, and the controller body of the controller 500, the transmission 400 and the motor 200 are integrated as a whole, so that the electric assembly 1 has a compact structure. The controller 500 is mounted on the transmission 400 and the motor 200, and line bundles such as a relatively long three-phase line do not need to be disposed between the controller 500 and the motor 200, to save the mounting space, so that the entire electric assembly 1 is concise and beautiful. Furthermore, mounting points of the controller 500 on the frame are reduced, the entire vehicle structure is simplified, assembly procedures are reduced, production costs and development costs are reduced, the center of gravity of the electric assembly 1 is lowered, and the entire height is reduced, so that the requirement on the mounting space of the entire vehicle is lowered, which may be applicable to both a front wheel drive vehicle and a rear wheel drive vehicle, and is beneficial to both vibration of the electric assembly 1 and the center of gravity of the entire vehicle.

Moreover, because the controller body is disposed in the folded space 40, the folded space 40 may be used, thereby moving the controller 500 downward into the folded space 40, and further reducing the entire height of the box assembly 100 of the electric vehicle.

Specifically, an end portion of the half shaft is provided with a ball cage, the controller 500 is located above the ball cage, and the controller 500 is not in contact with the ball cage. Because the ball cage may transfer power out under various deformations, power transfer is facilitated. The controller 500 is mounted above the ball cage, to avoid a case in which the controller 500 is damaged because of vibration of the ball cage when the controller 500 and the ball cage are in contact.

Figure 12:
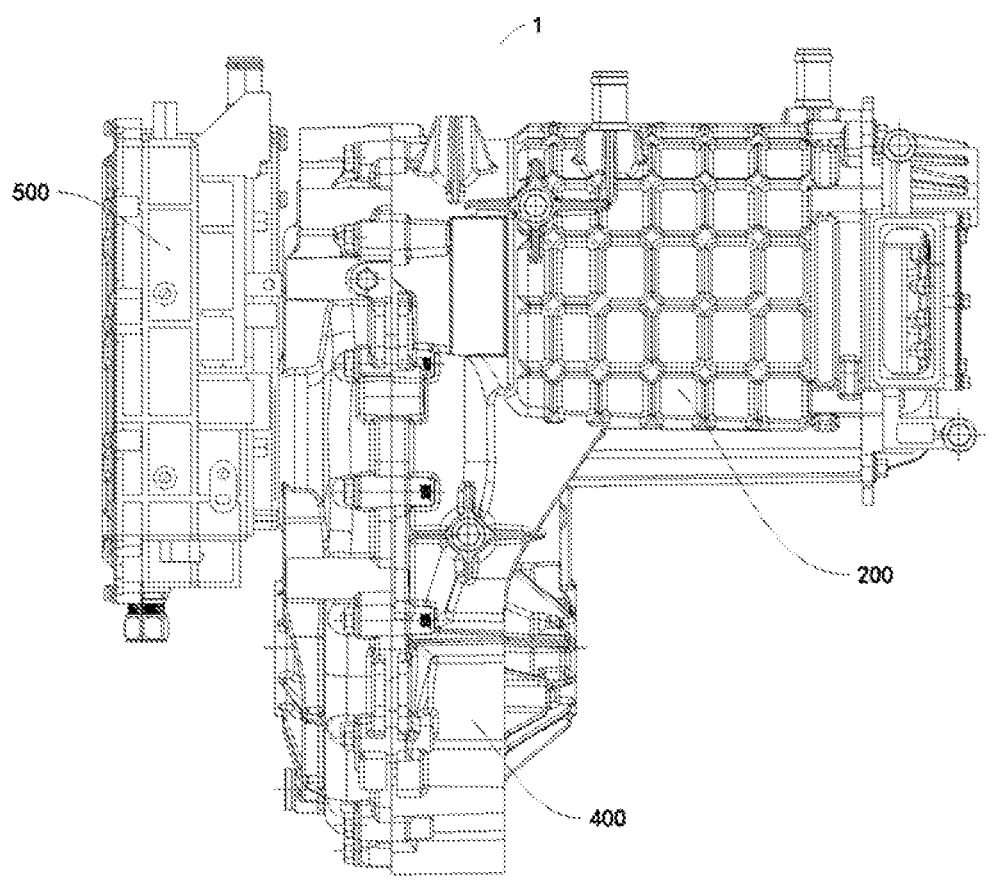
FIG. 12 is a schematic structural diagram of an electric assembly according to another embodiment of the present disclosure.
Figure 13:
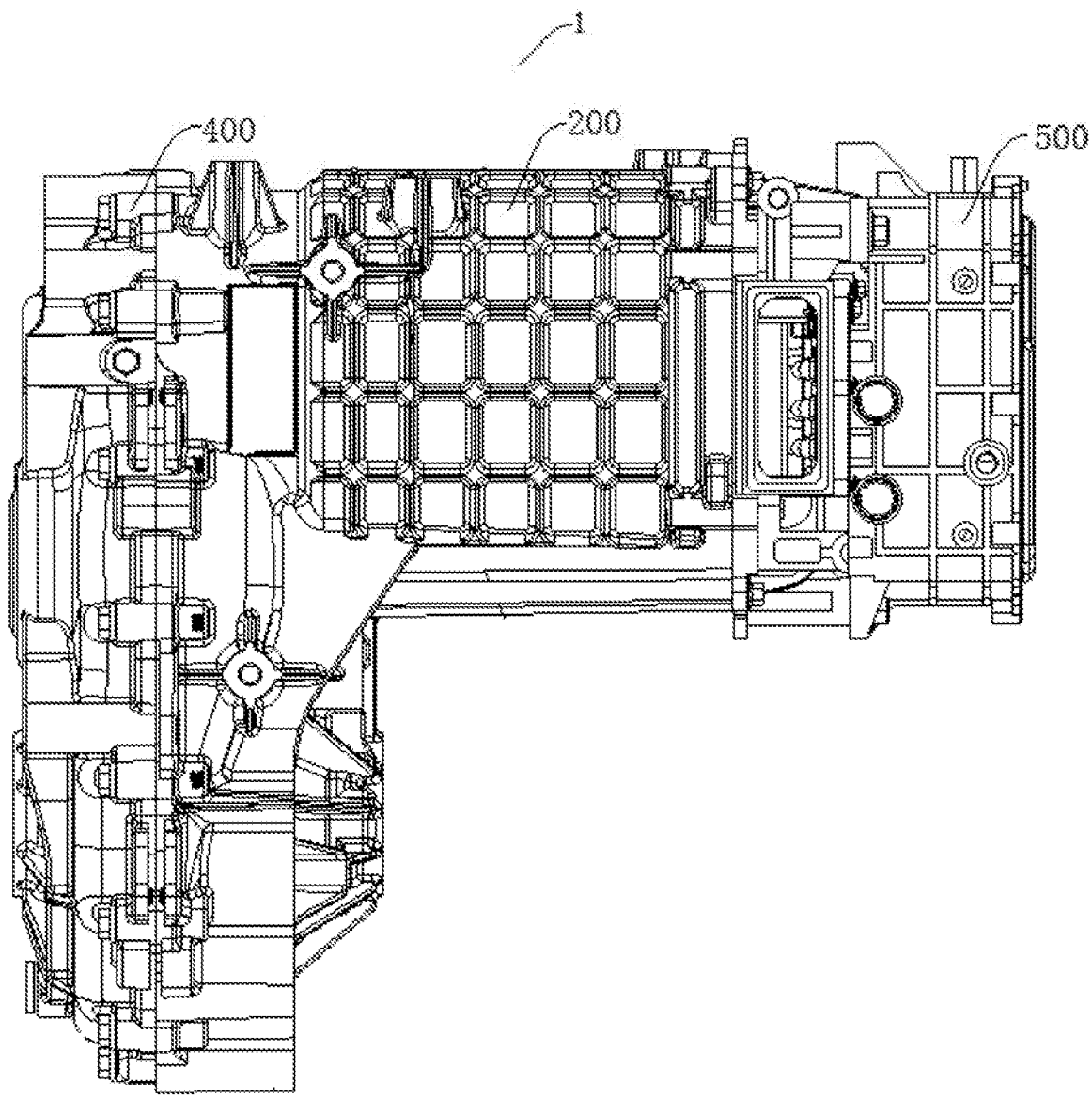
FIG. 13 is a schematic structural diagram of an electric assembly according to another embodiment of the present disclosure.

According to another embodiment of the present disclosure, as shown in FIG. 12 and FIG. 13, the controller 500 and the motor 200 are mounted on a same side or two sides of the transmission 400.

As shown in FIG. 12, the motor 200 is located on a front side of the transmission 400, and the controller 500 is located on a rear side of the transmission 400. In this case, the motor 200 and the controller 500 may be respectively located on the front and rear sides of the transmission 400 in the horizontal direction. Certainly, it may be understood that, the controller 500 may alternatively be located on the front side of the transmission 400, and the motor 200 may alternatively be located on the rear side of the transmission 400.

Figure 6:
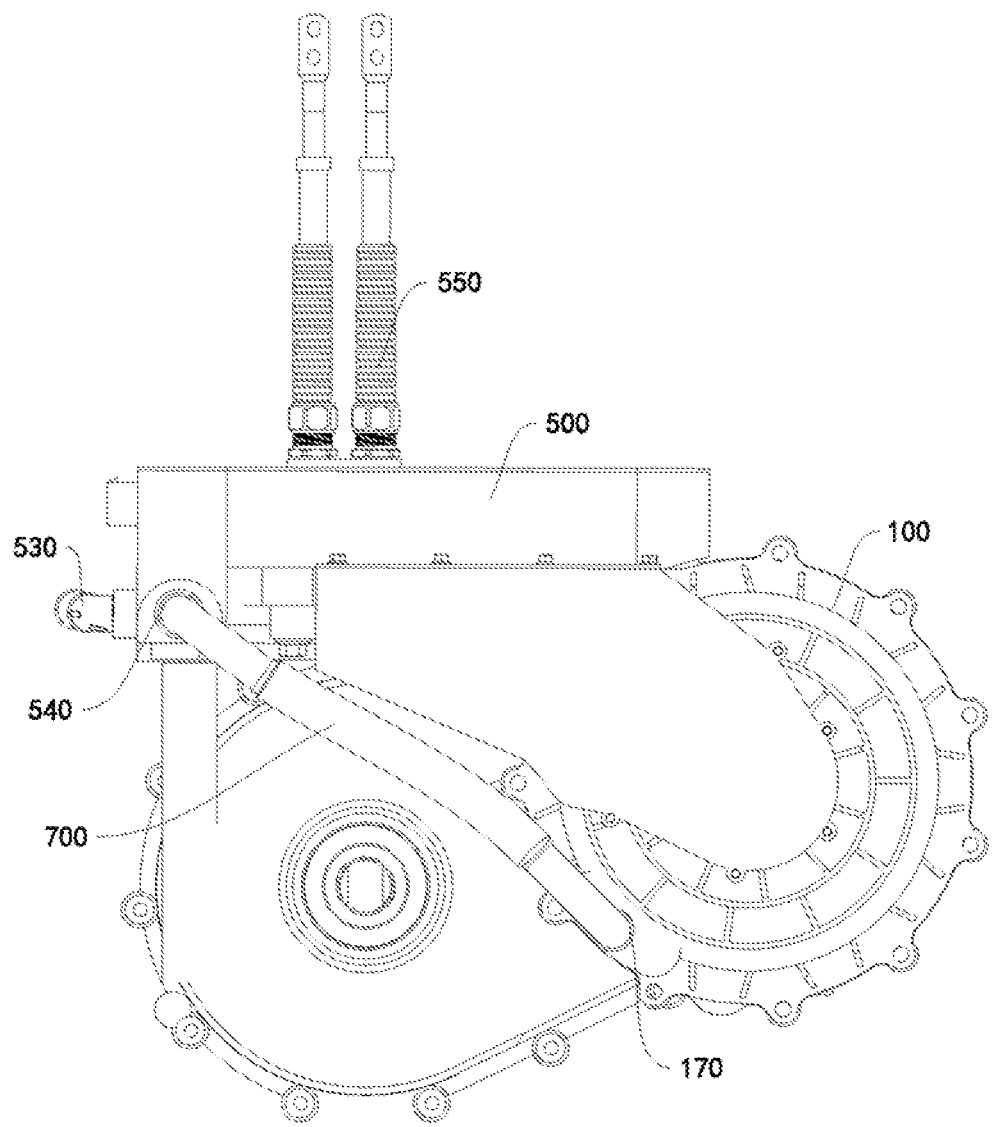
FIG. 6 is a schematic local structural diagram of an electric assembly according to an embodiment of the present disclosure.

As shown in FIG. 13, the controller 500 is mounted at the front end of the motor 200, and the motor 200 is mounted on the front side of the transmission 400. In this case, the controller 500 and the motor 200 are both located on the front side of the transmission 400. As shown in FIG. 6, the controller 500 may alternatively be mounted on the right side of the motor 200, and the motor 200 is mounted on the front side of the transmission 400. In this case, the controller 500 and the motor 200 are both located on the front side of the transmission 400. Certainly, it may be understood that, the controller 500 and the motor 200 may alternatively be both located on the rear side of the transmission 400.

Figure 14:
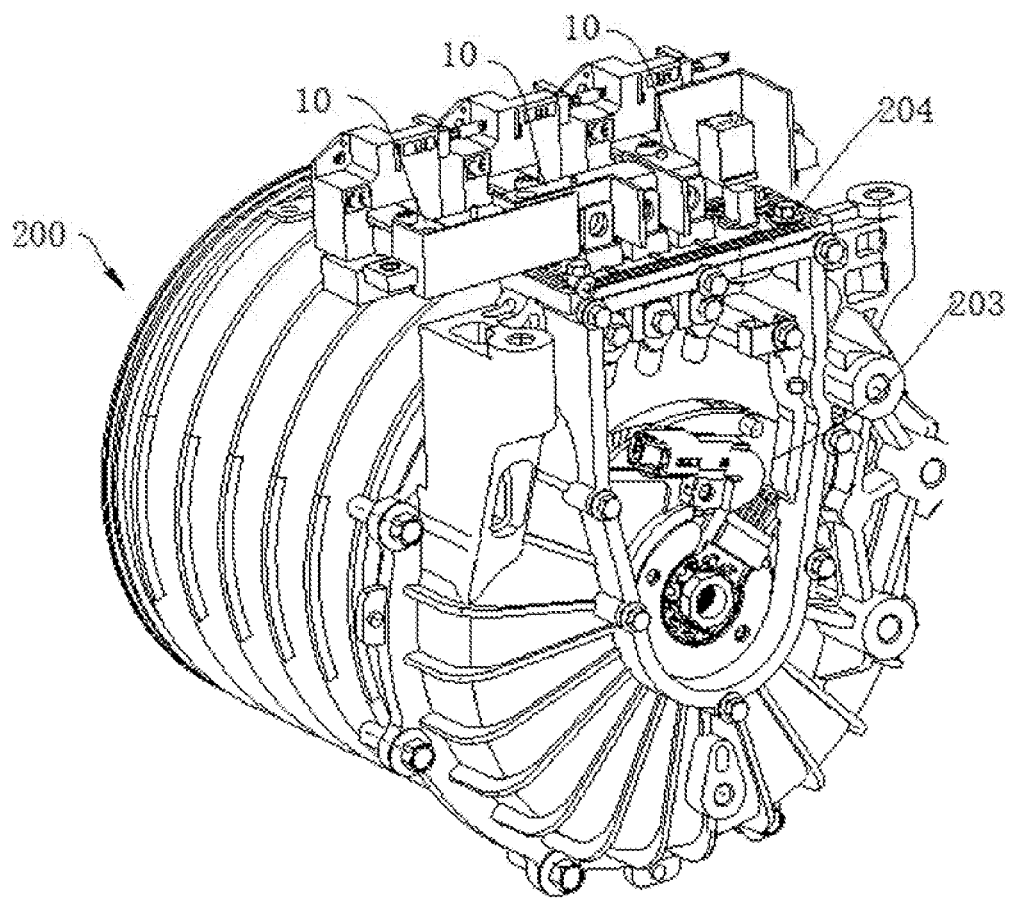
FIG. 14 is a schematic local structural diagram of an electric assembly according to another embodiment of the present disclosure.
Figure 15:
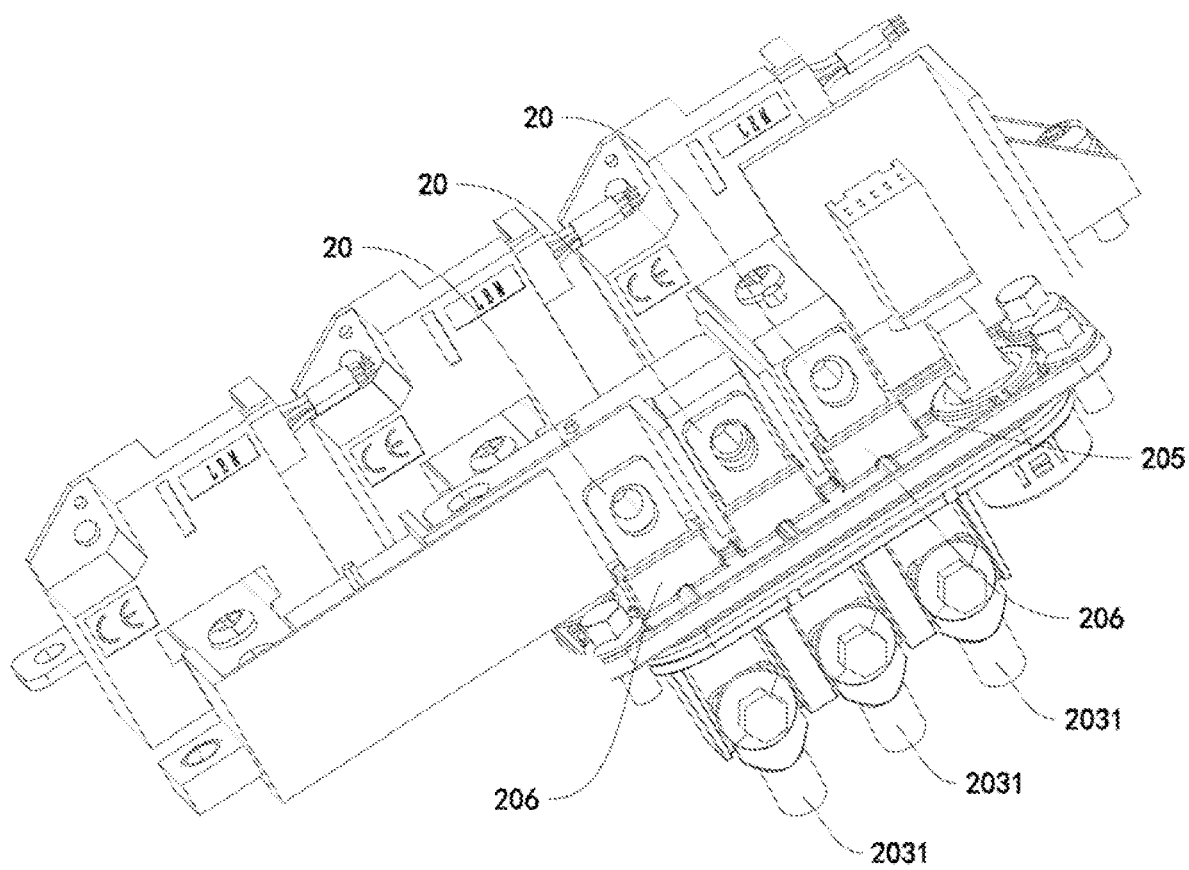
FIG. 15 is a schematic local structural diagram of an electric assembly according to another embodiment of the present disclosure.
Figure 16:
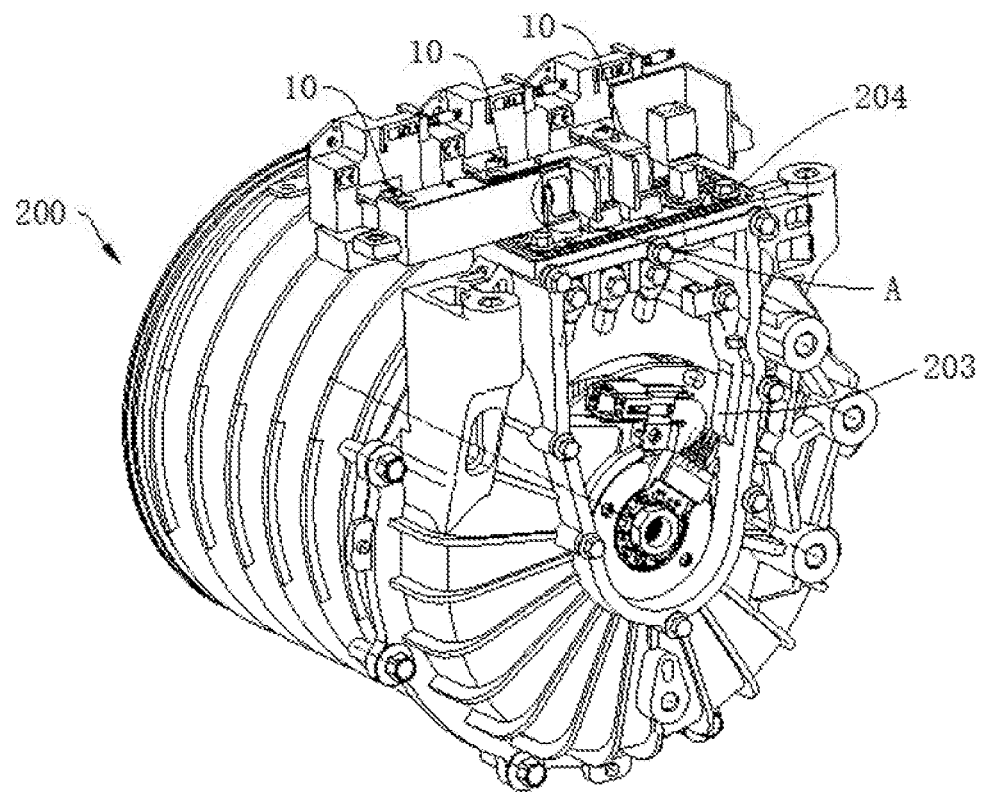
FIG. 16 is a schematic local structural diagram of an electric assembly according to another embodiment of the present disclosure.

According to another embodiment of the present disclosure, as shown in FIG. 14, the electric assembly 1 further includes a conductive sheet 20, where the conductive sheet 20 is configured to connect the controller 500 and the motor 200. For example, the conductive sheet 20 has a controller connection end and a motor connection end, the controller connection end is used for connecting to the controller 500, for example, connecting to a three-phase line of the controller 500, the motor connection end is used for connecting to the motor 200, for example, connecting to a three-phase line of the motor 200, and the conductive sheet 20 is fixed to the controller 500 through a bolt. In this way, external three-phase lines and connection bases may be left out, the length of the three-phase lines is reduced, the connection base structure is left out, and costs are reduced.

Specifically, the motor 200 includes a motor body 203 and a connection device 204, the connection device 204 is mounted on the motor body 203, the motor body 203 has a plurality of leading wires 2031, the connection device 204 includes a plurality of conductive sheets 20, and the plurality of conductive sheets 20 are respectively connected to the corresponding leading wires 2031, where the conductive sheet 20 has a controller connection end, and the controller connection end of the conductive sheet 20 is used for directly connecting to the controller 500.

In other words, the controller 500 is directly connected to the controller connection end at one end of the conductive sheet 20, and the other end of the conductive sheet 20 is connected to the leading wire 2031 of the motor body 203 (the leading wire may be a leading wire of a motor winding). In this way, the controller 500 may control the motor body 203, and the connection between the motor controller 100 and the motor body 203 through the conductive sheet 20 may make the entire structure of the motor 200 more compact.

In some embodiments, the connection device 204 further includes a supporting plate 2042, the supporting plate 2042 is relatively fixedly mounted on the motor body 203, the supporting plate 2042 is provided with a positioning insert 20421, two ends of the positioning insert 20421 respectively stretch out of two opposite side surfaces on the supporting plate 2042, a part of the conductive sheet 20 is inserted into the positioning insert 20421, and the controller connection end of the conductive sheet 20 stretches out of the positioning insert 20421. In other words, the supporting plate 2042 is fixedly mounted on the motor body 203, the positioning insert 20421 stretches out of two sides of the supporting plate 2042, the conductive sheet 20 is inserted into the positioning insert 20421, and two ends of the conductive sheet partially stretch out of the positioning insert 20421 and are used for respectively connecting to the leading wire 2031 and the controller connection end, where the positioning insert 20421 provides supporting and positioning for the conductive sheet 20.

Further, the plurality of conductive sheets 20 are disposed side by side and spaced apart from each other. It may be understood that, the plurality of conductive sheets 20 spaced apart from each other may prevent a case of short-circuit or confused connection from occurring.

That is to say, motor connection ends of conductive members 10 are connected to the conductive sheets 20 in a one-to-one correspondence, the conductive member 10 and the conductive sheet 20 are electrically connected, and the conductive member 10 and the conductive sheet 20 are directly connected without a conducting wire or another connection device. In this way, the line of the electric assembly 1 may be shortened, thereby improving the anti-interference capability, and greatly saving the space.

In an embodiment, the conductive member 10 and the conductive sheet 20 are in screw connection. The screw connection is self-locking connection, the connection is stable and not easy to be loose, and dismounting is convenient. Certainly, the above described embodiments are only schematic, and cannot be understood as a limitation on the protection scope of the present disclosure. For example, the conductive member 10 and the conductive sheet 20 may be in insertion connection, sticking connection, welding connection, riveting connection or the like.

Figure 17:
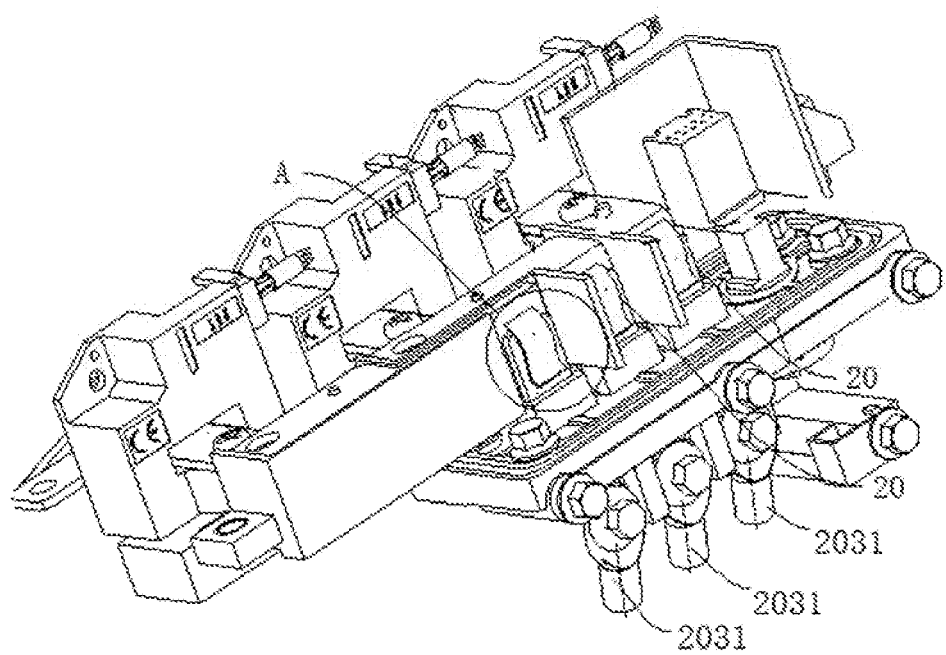
FIG. 17 is a schematic local structural diagram of an electric assembly according to another embodiment of the present disclosure.
Figure 18:
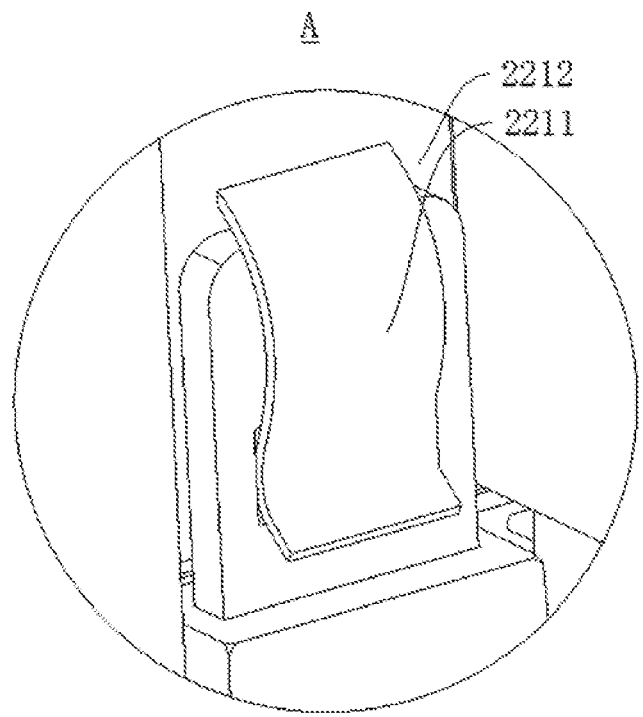
FIG. 18 is an enlarged diagram of a location A in FIG. 17.

According to another embodiment of the present disclosure, as shown in FIG. 17, the electric assembly 1 further includes a conductive sheet 20, where the conductive sheet 20 is stuck in the controller 500 or the conductive sheet 20 is fixed to the controller 500 through a bolt. The conductive sheet 20 has a controller connection end and a motor connection end, the controller connection end is used for connecting to the controller 500, for example, connecting to a three-phase line of the controller 500, the motor connection end is used for connecting to the motor 200, for example, a three-phase line of the motor 200, and the conductive sheet 20 is stuck in the controller 500. In this way, dismounting and mounting of the conductive sheet 20 are facilitated, external three-phase lines and connection bases may be left out, the length of the three-phase lines is reduced, the connection base structure is left out, and costs are reduced.

Specifically, the electric assembly 1 includes a motor 200 and a controller 500. The motor 200 includes a motor body 203 and a connection device 204, the connection device 204 is mounted on the motor body 203, the motor body 203 has a plurality of leading wires 2031, the connection device 204 includes a plurality of conductive sheets 20, and the plurality of conductive sheets 20 are respectively connected to the corresponding leading wires 2031, where the conductive sheet 20 has a controller connection end. The motor controller 100 is mounted on the motor 200, the motor controller 100 has a conductive member 10, and the conductive member 10 has a power supply connection end used for connecting to a power supply and a motor connection end 2212 used for directly connecting to the motor 200, where one of the motor connection end 2212 of the conductive member 10 and the controller connection end of the conductive sheet has an insertion structure and the other one and the insertion structure are in insertion connection.

In other words, the power supply connection end of the conductive member 10 is connected to the power supply, and the motor connection end 2212 of the conductive member 10 and the controller connection end of the conductive sheet 20 are connected. That is to say, the motor controller 100 is directly connected to the controller connection end at one end of the conductive sheet 20, and the other end of the conductive sheet 20 is connected to the leading wire 2031 of the motor body 203 (the leading wire 2031 may be a leading wire of a motor winding). In this way, the motor controller 100 may control the motor body 203, and the connection between the motor controller 100 and the motor body 203 through the conductive sheet 20 may make the entire structure of the motor 200 more compact.

Moreover, the motor connection end 2212 of the conductive member 10 and the conductive sheet 20 of the motor 200 are connected through an insertion structure. It may be understood that, compared with an insulation line wiring manner, the insertion connection manner is simpler, procedures are simplified, and the time is saved. Moreover, when a bumping case is encountered, integrity of the conductive sheet 20 of the motor may be ensured, and occurrence of cases such as bending the conductive sheet 20 and breaking the conductive sheet 20 is reduced.

That is to say, motor connection ends 2212 of conductive members 10 are connected to the conductive sheets 20 in a one-to-one correspondence, the conductive member 10 and the conductive sheet 20 are electrically connected, and the conductive member 10 and the conductive sheet 20 are directly connected without a conducting wire or another connection device. In this way, the line of the electric assembly 1 may be shortened, thereby improving the anti-interference capability, and greatly saving the space.

In some embodiments, the conductive sheet 20 is provided with a stop groove, the insertion structure is provided with a stop protrusion, and the stop protrusion is properly buckled into the stop groove. When the insertion structure and the conductive sheet 20 are connected, the stop protrusion matches the stop groove. In this way, the contact area between an insertion sheet 2211 and the conductive sheet 20 may be increased, and the insertion sheet 2211 may be prevented from transiently departing from the conductive sheet 20 during vibration, to prevent a case of undesired contact from occurring.

According to another embodiment of the present disclosure, the controller 500 has a controller cooling waterway, the controller 500 is provided with a controller waterway inlet connector and a controller waterway outlet connector respectively in communication with the controller cooling waterway, the motor 200 has a motor cooling waterway, the motor 200 is provided with a motor waterway inlet connector and a motor waterway outlet connector respectively in communication with the motor cooling waterway, and the controller waterway outlet connector is connected to the motor waterway inlet connector through a bolt.

In the electric assembly 1 according to one embodiment of the present disclosure, the electric assembly and the motor 200 are directly butted, to shorten the waterway without an external rubber water pipe. The electric assembly 1 has a compact structure and is at a relatively high integration level, and therefore the space utilization is relatively high.

Figure 19:
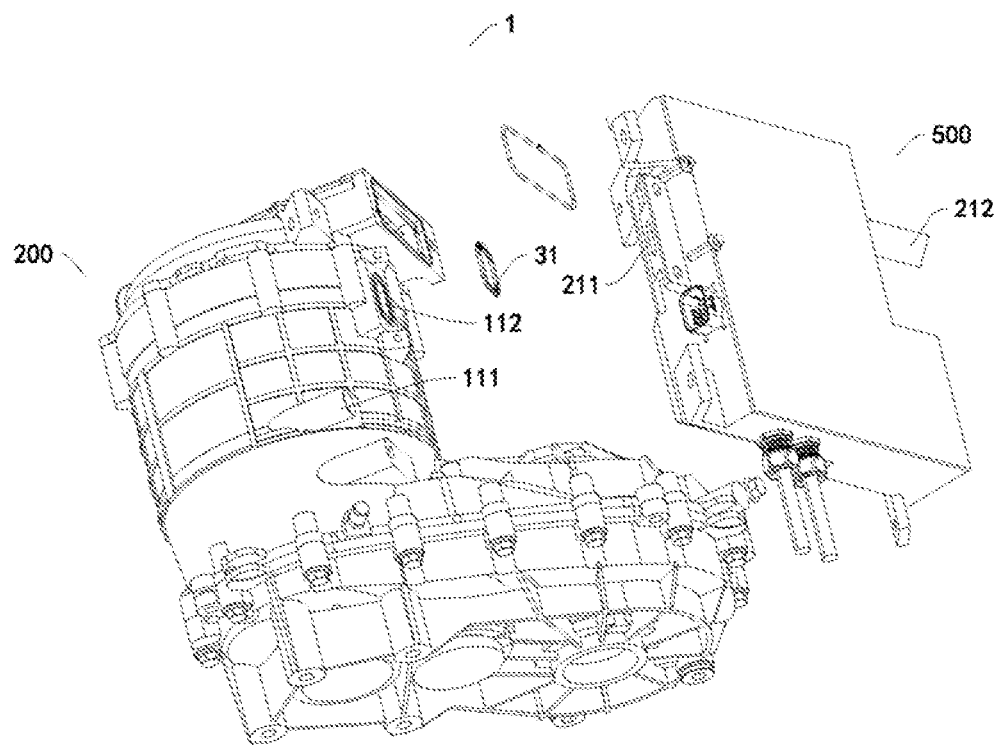
FIG. 19 is an exploded view of an electric assembly according to another embodiment of the present disclosure.
Figure 20:
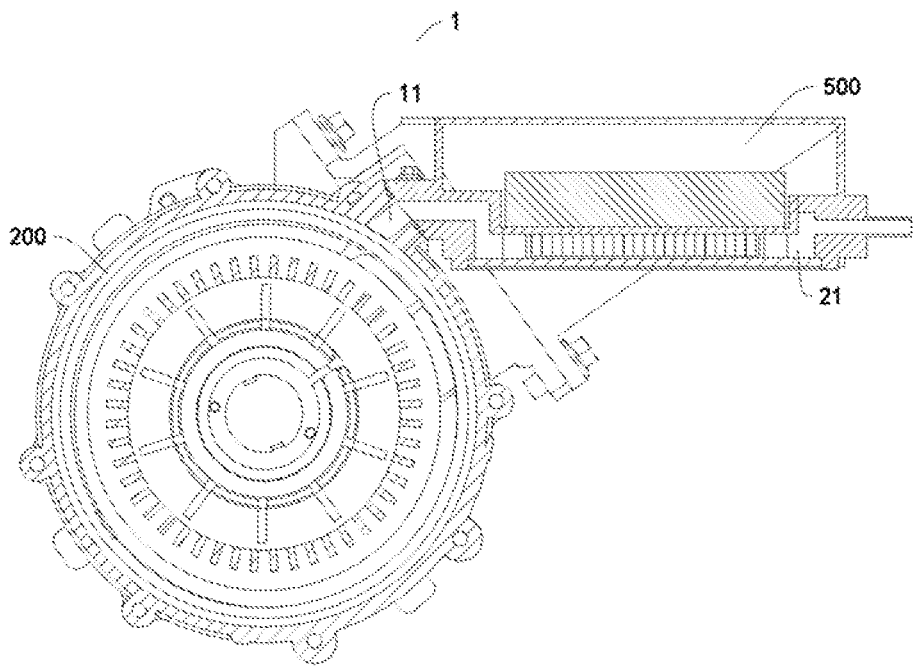
FIG. 20 is a cross-sectional view of an electric assembly according to another embodiment of the present disclosure.

Specifically, as shown in FIG. 19 and FIG. 20, the motor 200 has a first cooling passage 11, and the first cooling passage 11 has a first interface 111 and a second interface 112. The controller 500 has a second cooling passage 21, the second cooling passage 21 has a third interface 211 and a fourth interface 212, and the controller 500 is mounted on the motor 200. The second interface 112 and the third interface 211 are butted, and there is a first seal structure 31 around a location at which the second interface 112 and the third interface 211 are butted.

That is to say, direct butting is used for a cooling water channel between the motor 200 and the controller 500 to achieve an objective of cooling water circulation, and steps of cooling water circulation are as follows: Cooling water in a water tank enters the second cooling passage 21 from the location of the fourth interface 212 of the controller 500, cools related components in the controller 500 and then flows out from the location of the third interface 211; because the third interface 211 and the second interface 112 are butted, the water flow enters the motor 200 through the location of the second interface 112 on the motor 200, cools related components in the motor 200 and then returns to the water tank from the location of the first interface 111, to implement cooling water circulation and complete a function of a cooling system.

As shown in FIG. 20, the second interface 112 and the third interface 211 are directly butted without being connected through a pipeline, the motor 200 and the controller 500 have a more compact structure, and are at a relatively high integration level, and the space utilization may be improved. It should be noted that, the butting in butting the third interface 211 and the second interface 112 means that the third interface 211 and the second interface 112 are coaxially butted. In other words, after the second interface 112 and the third interface 211 are butted, the second interface 112 and the third interface 211 are coaxial. In this way, the second interface 112 and the third interface 211 are connected stably and properly, and the flow velocity and the flowing direction of the cooling water entering the first cooling passage 11 from the second cooling passage 21 are relatively stable.

Moreover, the first seal structure 31 plays a role of sealing, and may avoid a case in which the cooling water leaks when passing through a location at which the second interface 112 and the third interface 211 are connected, to cause a hidden safety hazard.

The first seal structure 31 is preferably a seal ring, the seal ring has a wide source, is at a relatively low price, and is also convenient to mount, and the seal ring may be designed according to the shape of the interface, and may play a role of balancing the error. Certainly, the foregoing embodiment is only schematic, the first seal structure 31 is not limited to the seal ring, and the first seal structure 31 may alternatively achieve a seal effect through a structure such as an interference fitting structure, a hydraulic structure or a barometric structure.

Figure 21:
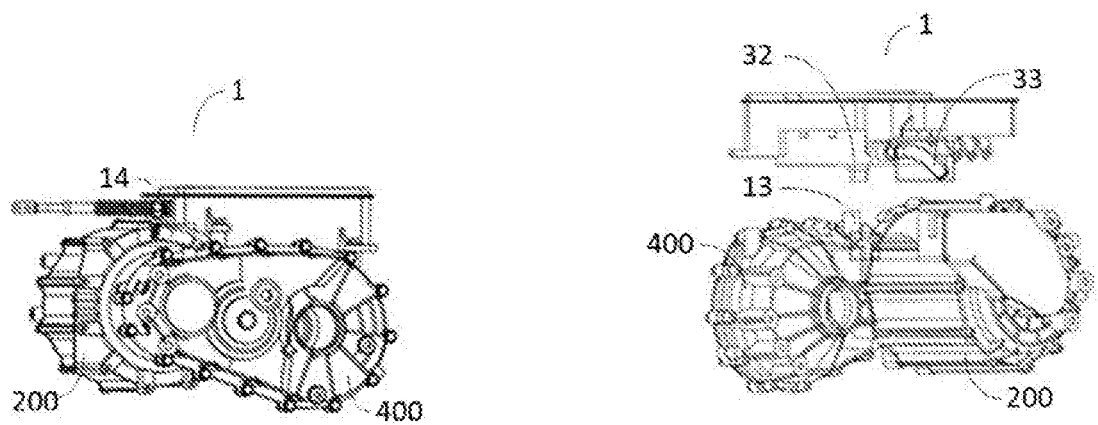
FIG. 21 is a schematic diagram of a location of a connector of a cooling waterway of an electric assembly according to another embodiment of the present disclosure.
Figure 22:
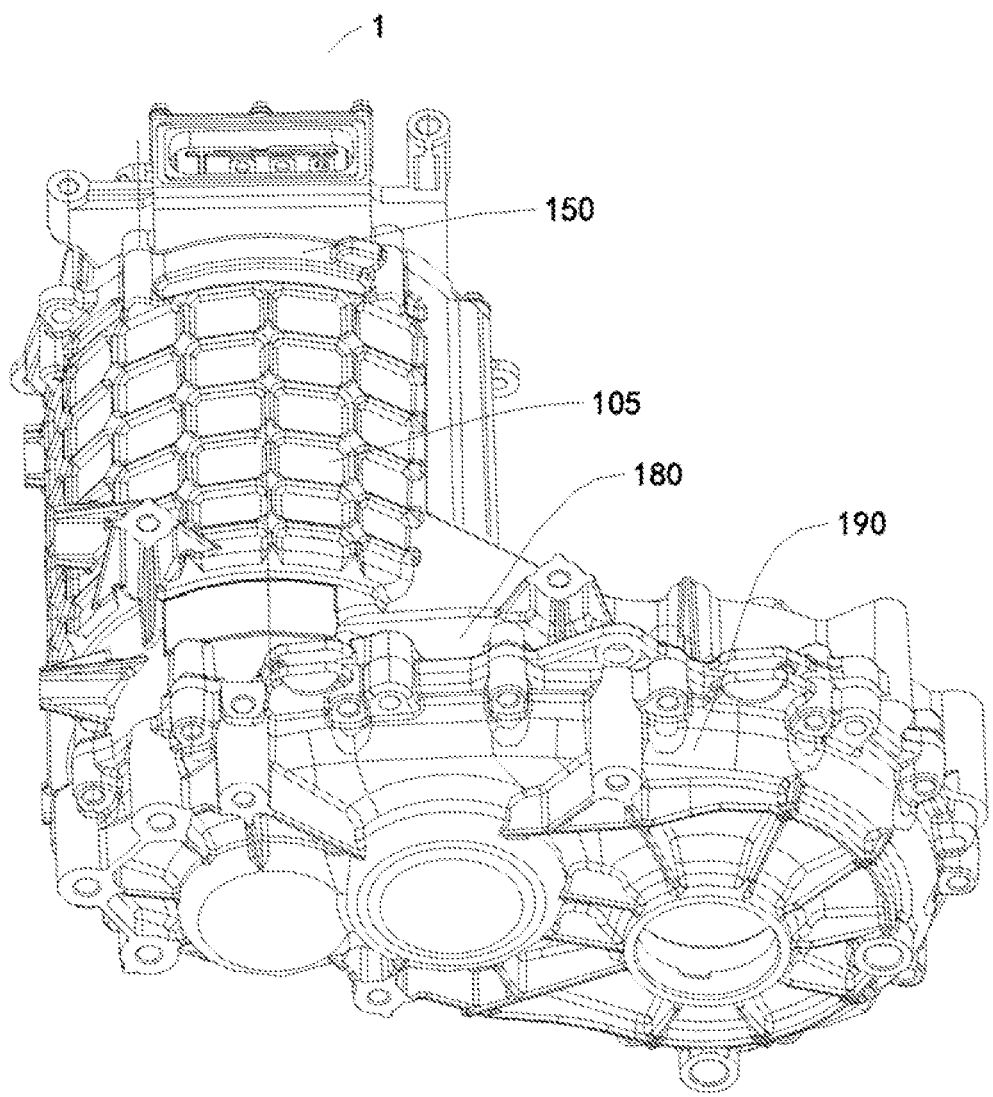
FIG. 22 is a schematic structural diagram of an electric assembly according to an embodiment of the present disclosure.

According to another embodiment of the present disclosure, as shown in FIG. 21, the controller 500 has a controller cooling waterway, the controller 500 is provided with a controller waterway inlet connector and a controller waterway outlet connector respectively in communication with the controller cooling waterway, the motor 200 has a motor cooling waterway, the motor 200 is provided with a motor waterway inlet connector and a motor waterway outlet connector respectively in communication with the motor cooling waterway, and the controller waterway outlet connector is connected to the motor waterway inlet connector through insertion. Specifically, the motor waterway inlet connector 13 may be disposed on a side of the motor 200 adjacent to the controller 500, the controller waterway outlet connector 32 may be disposed on a side of the controller 500 adjacent to the motor 200, the cooling water enters the internal waterway of the controller 500 from the controller waterway inlet connector 33, the cooling water flows out from the controller waterway outlet connector 32, and enters the internal waterway of the motor 200 through the motor waterway inlet connector 13, and finally the cooling water flows out from the motor waterway outlet connector 14. Therefore, the motor 200 and the controller 500 share a water cooling system, and a water pipe connecting the controller waterway outlet connector 32 and the motor waterway inlet connector 13 is omitted, thereby shortening the circulation path and time of the cooling water, enhancing the cooling effect, and reducing the costs.

Specifically, there are a motor holding cavity 103 and a transmission holding cavity 104 in communication with each other in the box assembly 100, the motor 200 is disposed in the motor holding cavity 103, and the transmission 400 is disposed in the transmission holding cavity 104. In this way, the disposition of the motor 200 and the transmission 400 is facilitated, to further help improve the space utilization of the electric assembly 1, so that the structure of the electric assembly 1 is more compact and proper.

More specifically, the motor holding cavity 103 and the transmission holding cavity 104 are arranged along an axial direction of a motor shaft 210, the box assembly 100 has a shaft via-hole 130 making the motor holding cavity 103 and the transmission holding cavity 104 be in communication with each other, and at least one of the motor shaft 210 and a main shaft 300 is threaded through the shaft via-hole 130 and connected to the other one. In this way, the mutual connection between the motor shaft 210 and the main shaft 300 is facilitated, to help the motor 200 smoothly transfer power to the transmission 400, and help improve transmission reliability of the electric assembly 1.

Optionally, as shown in FIG. 1, the electric assembly 1 further includes a seal cavity 600, the seal cavity 600 is integrally formed on an end face of the box assembly 100 close to one end of the motor holding cavity 103 and is in communication with the motor holding cavity 103 and the controller 500, the motor 200 has a terminal, and the terminal is threaded through the seal cavity 600 and directly electrically connected to the controller 500. In this way, the direct electrical connection between the motor 200 and the controller 500 is facilitated, to help improve the sealing performance of the electric assembly 1.

Further, the controller 500 is mounted on a circumferential surface of the box assembly 100 and supported on the seal cavity 600. It should be understood herein that, the circumferential surface of the box assembly 100 refers to a surface other than an axial end face of the motor shaft 210. In this way, the seal cavity 600 may play a role of supporting the controller 500, the structure of the electric assembly 1 may be made more proper and compact, to help save the mounting space of the controller 500, and help improve the space utilization of the electric assembly 1.

Figure 4:
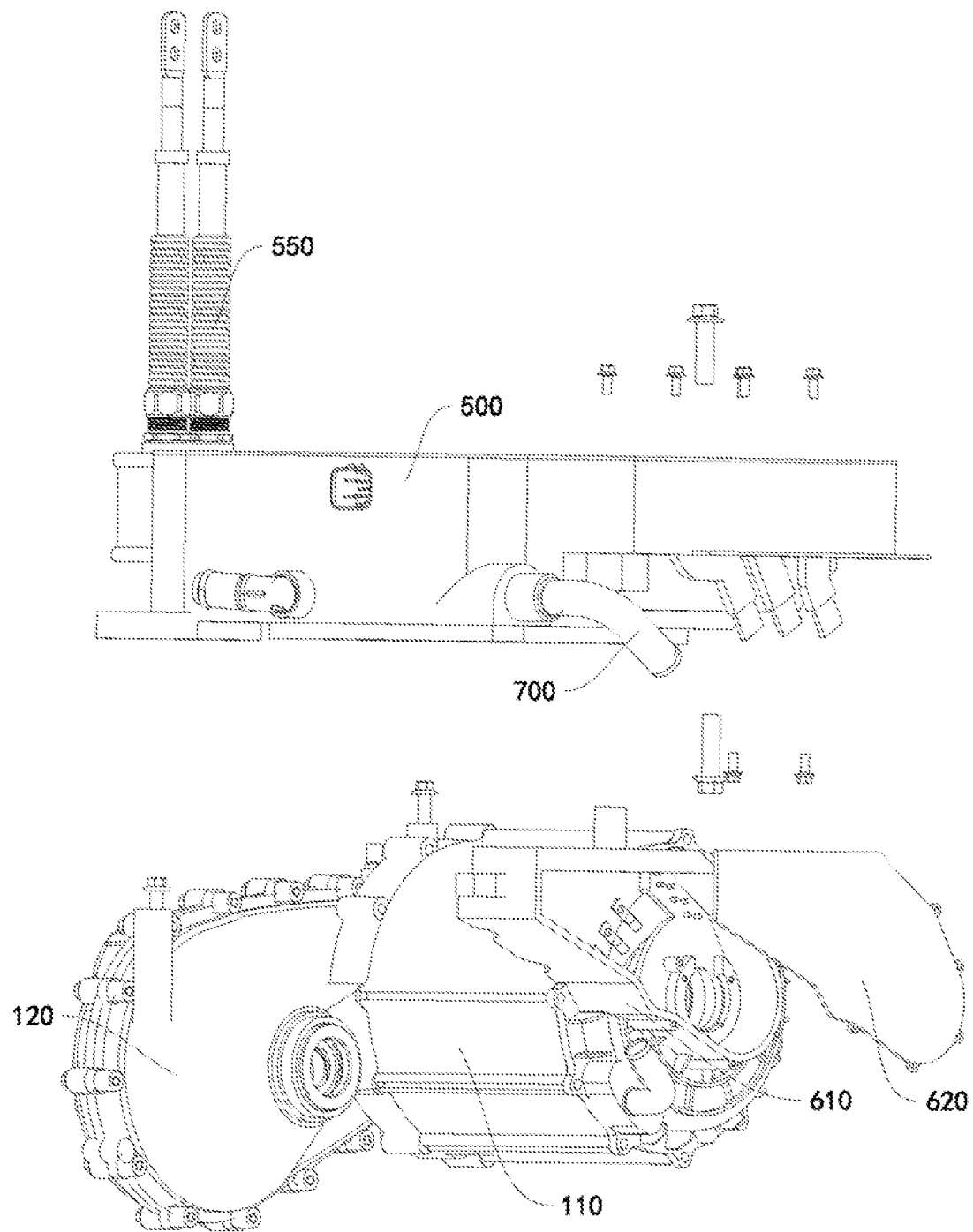
FIG. 4 is an exploded view of an electric assembly according to an embodiment of the present disclosure.

Specifically, as shown in FIG. 4, the seal cavity 600 includes a cavity body 610 and a cavity cover plate 620, the cavity body 610 is integrally formed on the box assembly 100, and the cavity cover plate 620 is detachably mounted on the cavity body 610. Specifically, after the cavity cover plate 620 is dismounted, the cavity body 610 may be opened. In this way, dismounting and mounting of the seal cavity 600 are facilitated, to help maintain the structure in the seal cavity 600, and help improve the maintenance efficiency of the electric assembly 1.

More specifically, as shown in FIG. 4, the box assembly 100 includes a motor segment 110 and a speed change segment 120, two ends of the motor segment 110 are respectively connected to the seal cavity 600 and the speed change segment 120, and two ends of the controller 500 are respectively supported on the speed change segment 120 and the seal cavity 600. In this way, the disposition of the motor 200, the transmission 400 and the controller 500 is facilitated, to help the box assembly 100 protect the electric assembly 1, and help improve the structure stability of the electric assembly 1.

Figure 3:
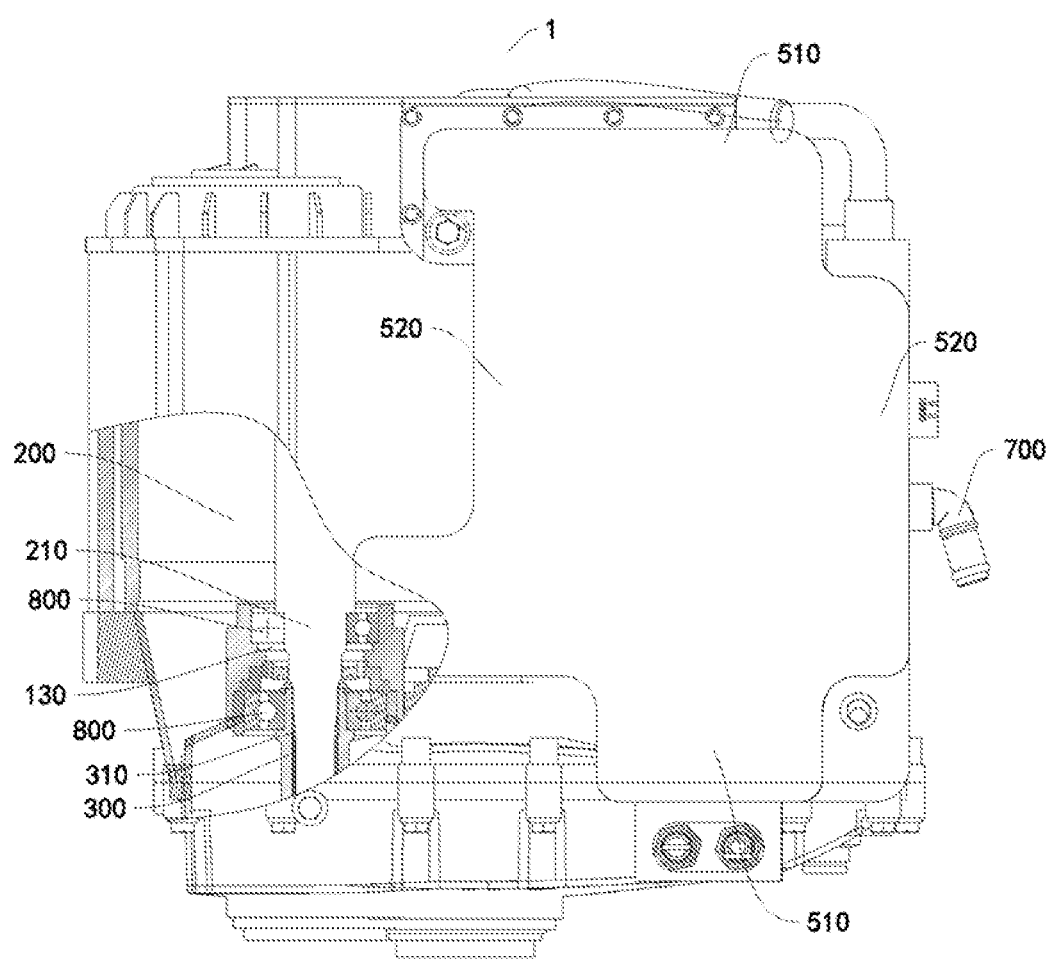
FIG. 3 is a local cross-sectional view of an electric assembly according to an embodiment of the present disclosure.

Further, as shown in FIG. 3, the controller 500 is roughly rectangular and has two transverse sides 510 parallel to each other and two longitudinal sides 520 parallel to each other on a horizontal plane, the speed change segment 120 and the seal cavity 600 are respectively disposed adjacent to the two transverse sides 510, the motor segment 110 has an axial direction parallel to the longitudinal sides 520 and is adjacent to one of the two longitudinal sides 520 and the longitudinal side 520 is supported on the motor segment 110. Specifically, the two transverse sides 510 of the controller 500 are respectively supported on the speed change segment 120 and the seal cavity 600, and one longitudinal side 520 of the controller 500 is supported on the motor segment 110. In this way, three sides of the controller 500 are respectively supported on the box assembly 100 and the seal cavity 600, to help improve stability and reliability of the controller 500.

Specifically, the controller 500 is provided with a direct current bus 550, and the direct current bus 550 is disposed adjacent to a transverse side 510. In this way, implementation of a control function of the controller 500 is facilitated.

Figure 5:
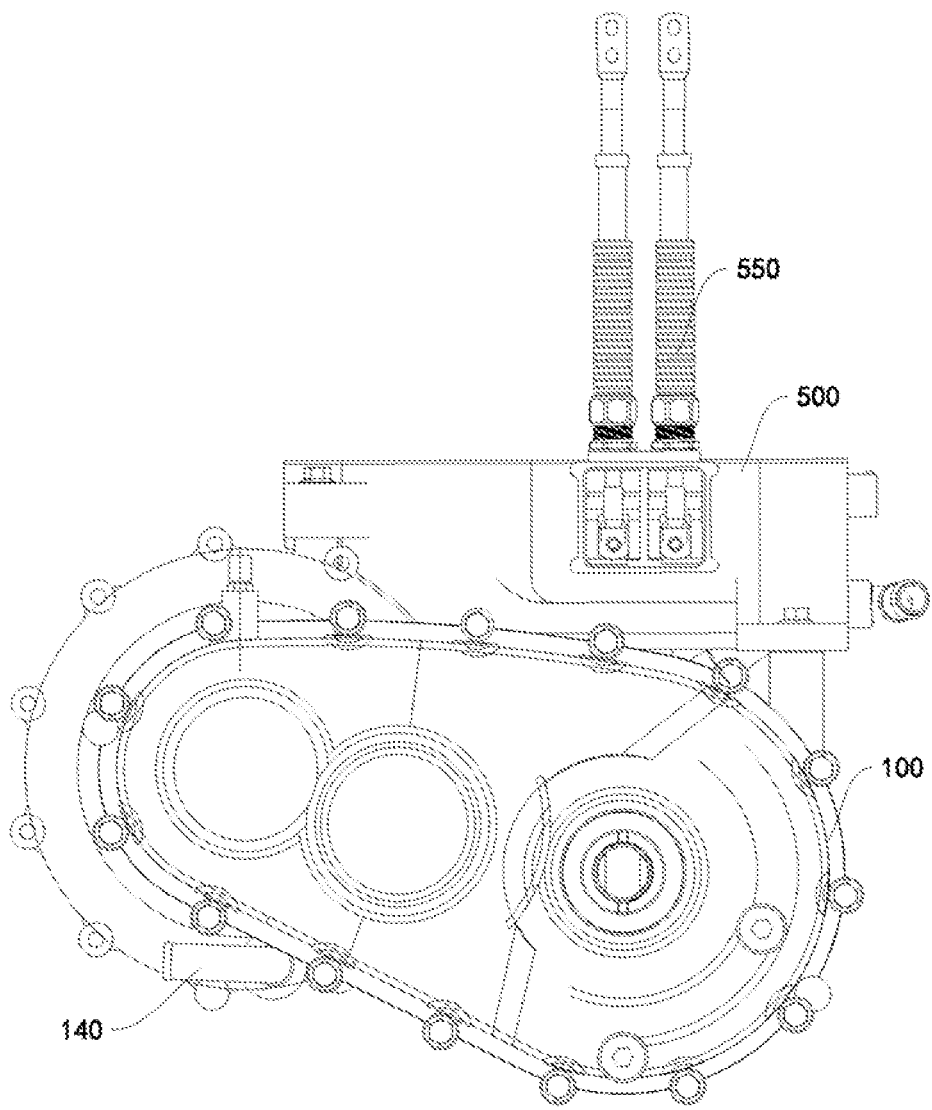
FIG. 5 is a schematic local structural diagram of an electric assembly according to an embodiment of the present disclosure.

Optionally, as shown in FIG. 5 and FIG. 6, the electric assembly 1 further includes a water cooling connection pipe 700, the controller 500 is provided with a water cooling inlet 530 in communication with a cooling water source, the box assembly 100 is provided with a water cooling outlet 140 in communication with the motor holding cavity 103, and the controller 500 is in communication with the motor holding cavity 103 through the water cooling connection pipe 700. Specifically, an end face of the box assembly 100 is provided with a motor water inlet 170, an end face of the controller 500 close to one end of the seal cavity 600 is provided with a controller water outlet 540, the motor water inlet 170 is located below the seal cavity 600, and the motor water inlet 170 and the water cooling outlet 140 are respectively located on two end faces of the motor holding cavity 103. The motor 200 and the controller 500 share a water cooling system, and the cooling water enters the internal waterway of the controller 500 from the water cooling inlet 530, flows out from the controller water outlet 540, enters the internal waterway of the motor 200 through the water cooling connection pipe 700 and the motor water inlet 170, and finally flows out from the water cooling outlet 140, so as to help shorten the circulation path of the cooling water and the circulation time of the cooling water, help improve the cooling effect of the cooling water, and help ensure the use performance of the motor 200 and the controller 500. Moreover, the integration level of the electric assembly 1 may be improved, to further simplify the structure of the electric assembly 1.

Figure 23:
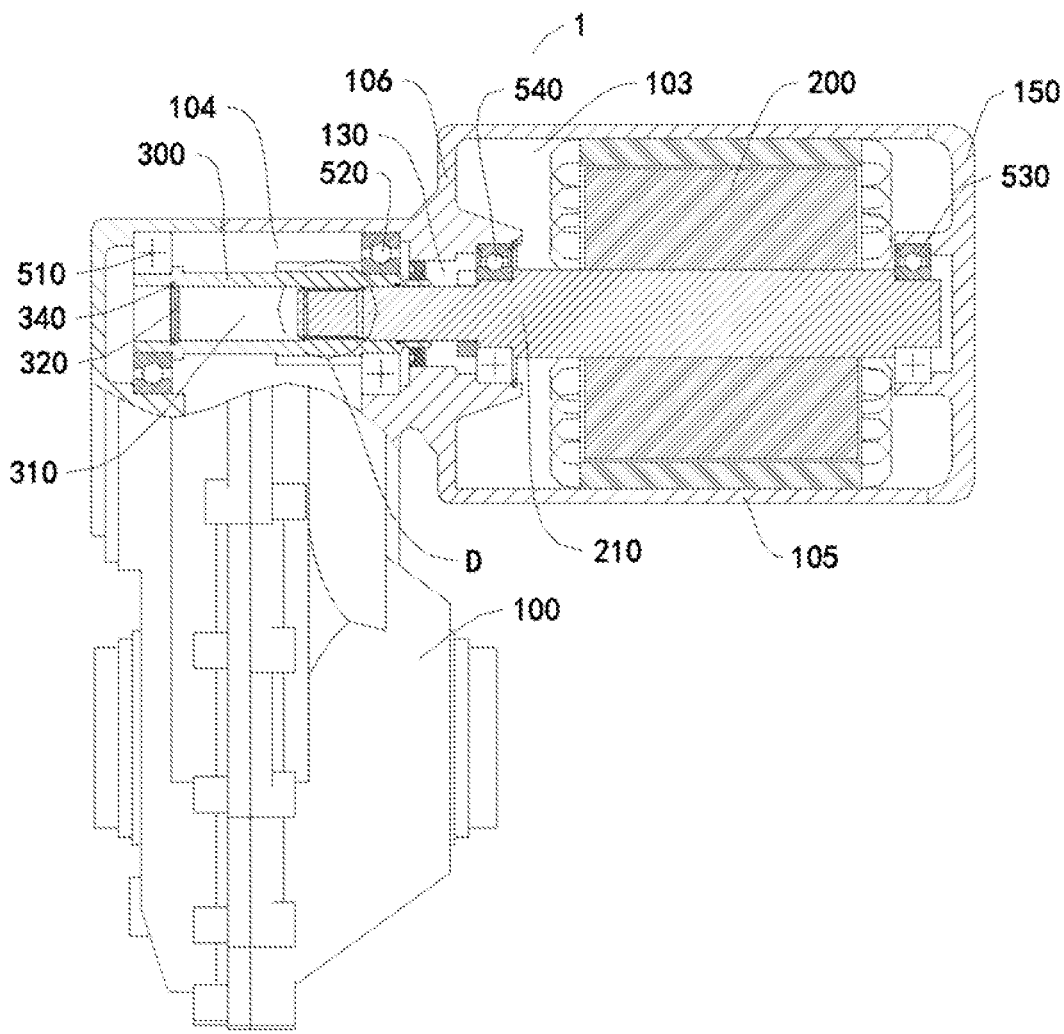
FIG. 23 is a local cross-sectional view of an electric assembly according to an embodiment of the present disclosure.

Specifically, as shown in FIG. 23, a mounting plate 160 is disposed in the box assembly 100, the mounting plate 160 divides a space within the box assembly 100 into a motor holding cavity 103 and a transmission holding cavity 104 that are arranged along an axial direction of a motor shaft 210, the mounting plate 160 has a shaft via-hole 130 making the motor holding cavity 103 and the transmission holding cavity 104 be in communication with each other, and the motor 200 is power-coupled to the transmission 400.

In the electric assembly 1 according to one embodiment of the present disclosure, the motor 200 and the transmission 400 are disposed in the box assembly 100. Compared with the motor assembly in the related art in which the front box of the transmission and the frontend cover of the motor are connected, the motor 200 and the transmission 400 share a box assembly 100, to implement the integrated design of the electric assembly 1, which not only may leave out a structure in which a plurality of box assemblies 100 are disposed, but also may leave out a bolt required to connect the motor assembly and the transmission assembly, so as to simplify the structure of the electric assembly 1, reduce the part quantity of the electric assembly 1, improve the integration level of the electric assembly 1, and improve the production efficiency of the electric assembly 1.

Moreover, the motor 200 and the transmission 400 share a box assembly 100. Compared with the motor assembly in the related art, the motor assembly and the transmission assembly may be prevented from being individually disposed to waste space, to help shorten an axial distance of the electric assembly 1, so that the structure of the electric assembly 1 is compact and proper, thereby improving the space utilization of the electric assembly 1, and facilitating the disposition of the electric assembly 1; and facilitating mounting and repair of the electric assembly 1, and helping improve reliability and stability of the electric assembly 1.

Moreover, the motor 200 and the transmission 400 share a box assembly 100, thereby helping reduce the weight of the electric assembly 1. For example, when the electric assembly 1 is applied to a vehicle 11, the entire weight of the vehicle 11 may be reduced, thereby helping reduce costs of the vehicle 11, reducing the energy loss of the vehicle 11, improving the operating efficiency of the vehicle 11, and improving the endurance capability of the vehicle 11.

Moreover, the box assembly 100 is disposed, the mounting plate 160 is disposed in the box assembly 100, and clamping needs to be performed only once during assembly, to facilitate assembly and forming of the electric assembly 1, help reduce the error of the electric assembly 1, facilitate mounting and disposition of the motor 200 and the transmission 400, help improve coaxiality and radial mounting accuracy of the motor 200 and the transmission 400, and help improve the operating performance of the electric assembly 1.

Figure 27:
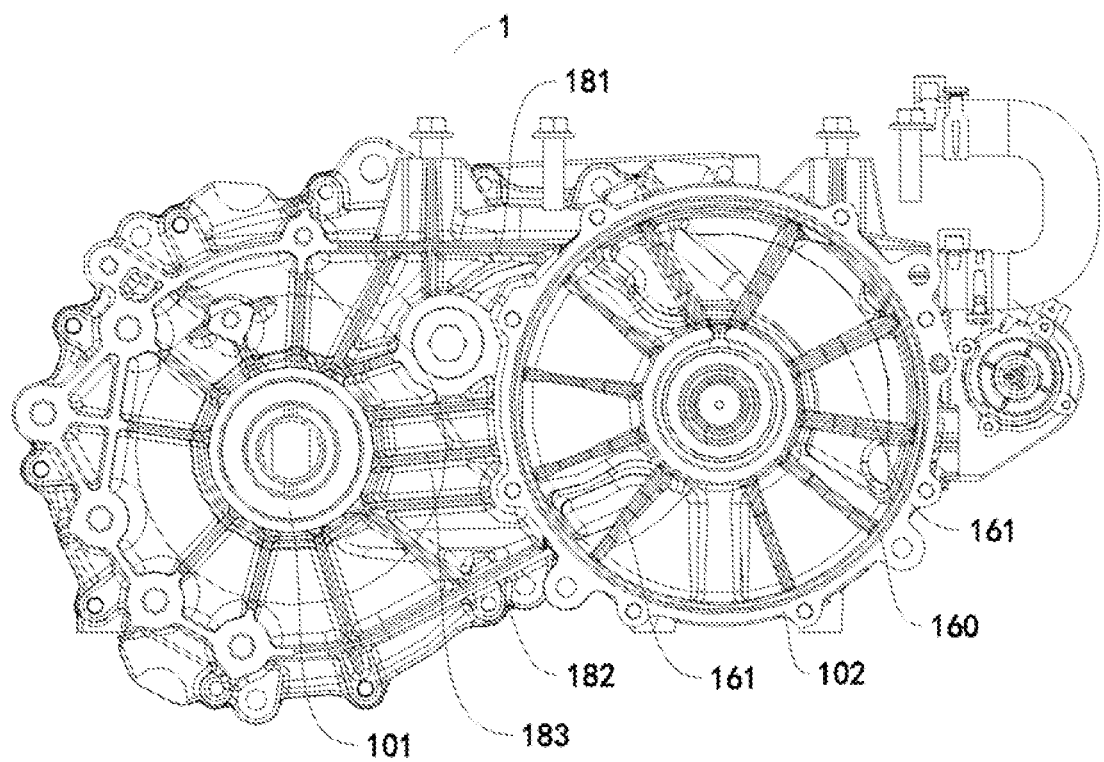
FIG. 27 is a schematic structural diagram of an electric assembly according to an embodiment of the present disclosure.
Figure 28:
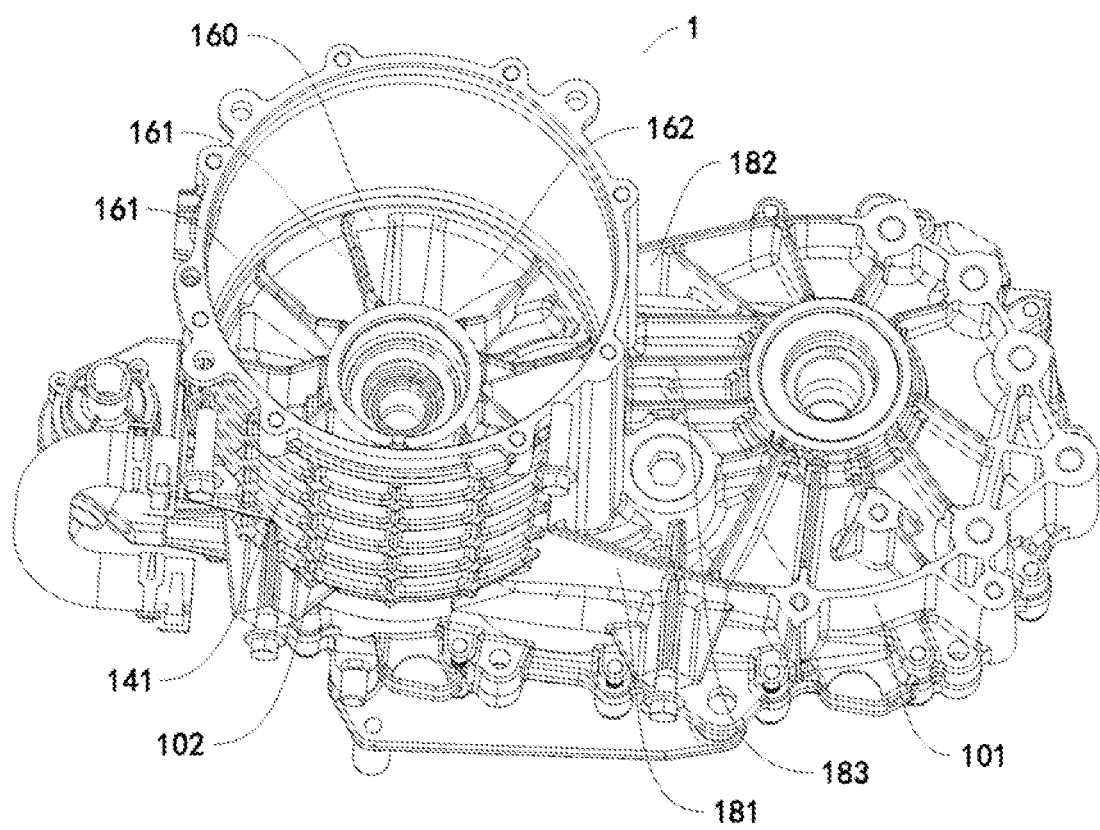
FIG. 28 is a schematic structural diagram of an electric assembly according to an embodiment of the present disclosure.

Specifically, as shown in FIG. 27 and FIG. 28, a side of the mounting plate 160 facing the motor 200 is provided with ribs. Because the ribs enhance the rigidity of the box assembly 100 and improve the natural frequency, resonance may be prevented from occurring in the electric assembly 1, to help reduce the noise of the electric assembly 1.

More specifically, the ribs divide a space between the mounting plate 160 and the motor 200 into a plurality of cavities. In this way, forming of the cavities 162 is facilitated, so as to cool the motor 200 by using air passing through the cavities 162.

Optionally, a maximum distance between the motor 200 and the mounting plate 160 is less than a preset distance. It should be understood herein that, the preset distance is a maximum distance making the mounting plate 160 cool the motor 200. For example, the maximum distance between the motor 200 and the mounting plate 160 may be less than 10 millimeters, and is preferably 7.5 millimeters. Because the preset value may be set to a relatively small value, the distance between the motor 200 and the mounting plate 160 is very small. In this way, the motor 200 and the mounting plate 160 may be cooled at a short distance between each other, and after the mounting plate 160 is cooled, the motor 200 can be quickly cooled.

According to an embodiment of the present disclosure, the mounting plate 160 is constructed as a part of a front box 180, and because lubricating liquid in the transmission cools the front box 180, the mounting plate 160 and the box assembly 100, for example, a motor housing 105 and a transmission box 101 may also be cooled. The cavities 162 are formed between the ribs of the mounting plate 160, and therefore, the air flowing through the cavities 162 is also cooled accordingly, and the motor 200 may be cooled by using the air flowing through the cavities 162, to help improve the heat dissipation performance of the electric assembly 1. In short, the lubricating liquid passing through the transmission 400 may cool the motor housing 105 and the housing of the transmission 400 at the same time.

According to another embodiment of the present disclosure, the mounting plate 160 is constructed as a part of the motor housing 105, and because lubricating liquid in the motor cools the motor housing 105, and may also cool the mounting plate 160 and transfer heat through the mounting plate 160, so that the transmission box 101 may also be cooled, thereby cooling the box assembly 100 and improving the entire cooling effect of the electric assembly 1. In short, the lubricating liquid passing through the motor 200 may also cool the motor housing 105 and the transmission 400 at the same time.

Specifically, during rotation of the motor 200, a stress is transferred to the box assembly 100 through a bearing, and ribs are added to the box assembly 100, to help increase rigidity and strength of the box assembly 100, prevent the box assembly 100 from being in contact with a coil of the motor 200, prevent components of the motor 200 from being damaged, and further improve operating reliability and stability of the motor 200.

Figure 31:
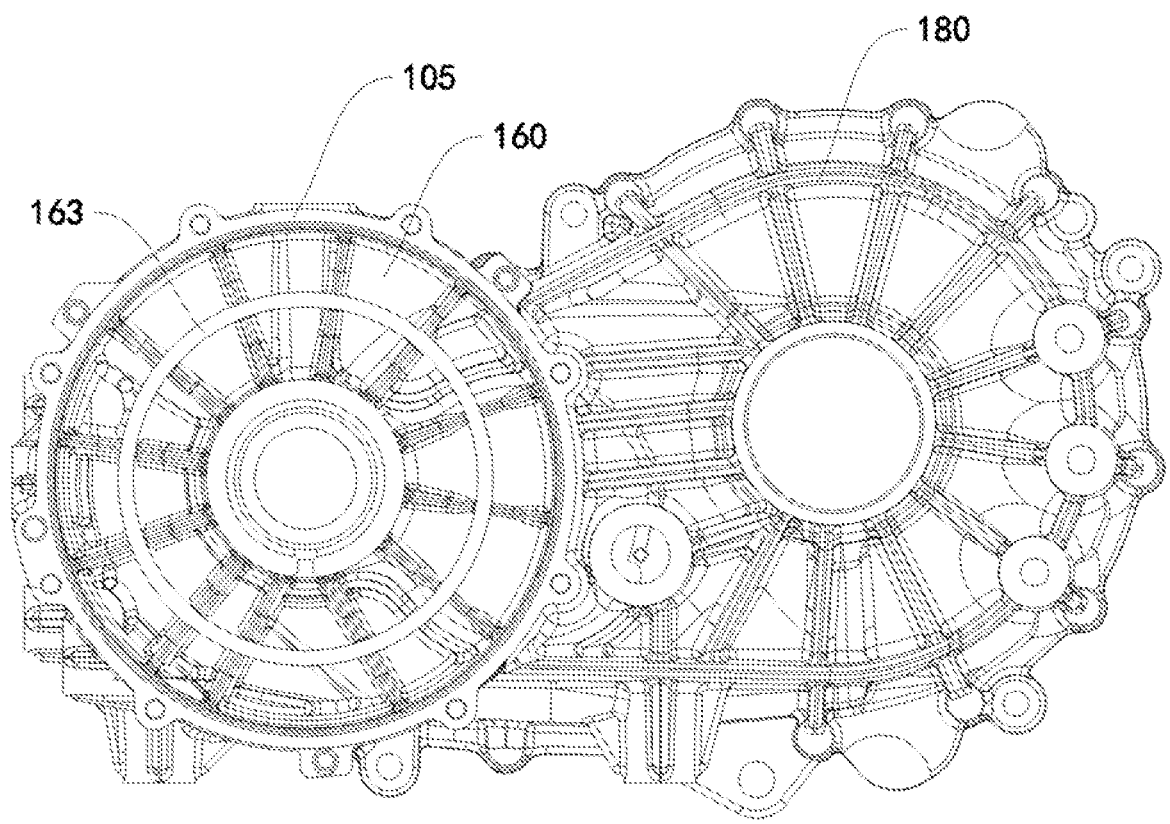
FIG. 31 is a schematic local structural diagram of an electric assembly according to another embodiment of the present disclosure.
Figure 32:
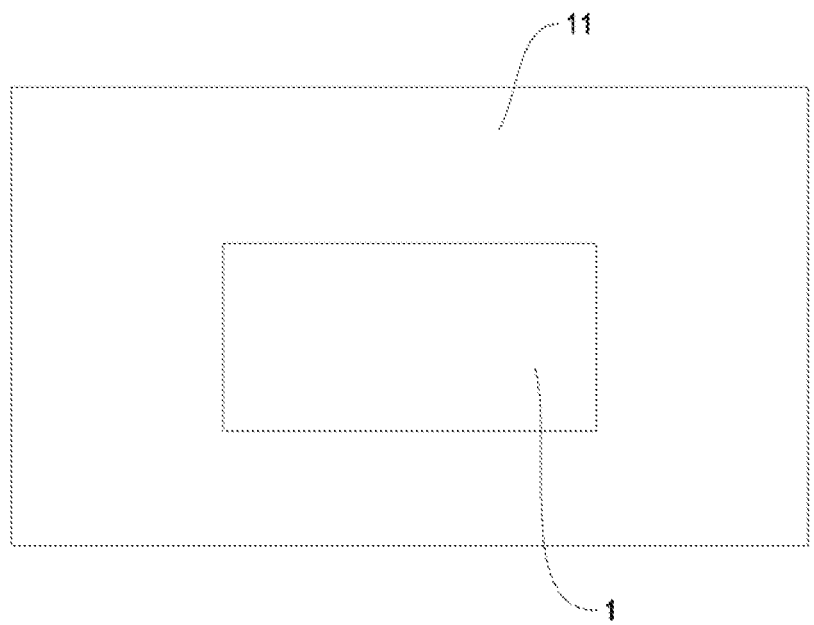
FIG. 32 is a schematic structural diagram of a vehicle according to an embodiment of the present disclosure.

According to an embodiment of the present disclosure, as shown in FIG. 31, the ribs include an annular rib 163 extending along a circumferential direction of the motor 200. In this way, rigidity and strength of the box assembly 100 may be improved, the structure stability of the box assembly 100 may be improved, and the heat dissipation capability and the cooling effect of the box assembly 100 may be improved.

According to another embodiment of the present disclosure, as shown in FIG. 28, the ribs include strip-shaped ribs 161 extending along a radial direction of the motor 200, there are a plurality of strip-shaped ribs 161 and the plurality of strip-shaped ribs 161 are spaced apart along a circumferential direction of the mounting plate 160. In this way, a more even force may be applied to the box assembly 100, to further help improve rigidity and strength of the box assembly 100, further help improve noise reduction performance and heat dissipation performance of the electric assembly 1, and improve the cooling effect of the electric assembly 1.

According to another embodiment of the present disclosure, the ribs include an annular rib 163 extending along a circumferential direction of the motor 200 and strip-shaped ribs 161 extending along a radial direction of the motor 200, there are a plurality of strip-shaped ribs 161 and the plurality of strip-shaped ribs 161 are spaced apart along a circumferential direction of the mounting plate 160. In this way, rigidity and strength of the box assembly 100 along the circumferential direction and the radial direction of the motor 200 may be improved at the same time, thereby improving the structure reliability of the box assembly 100, further improving the heat dissipation area of the box assembly 100, and improving heat dissipation and cooling performance of the electric assembly 1.

Specifically, heights of the strip-shaped ribs 161 relative to the mounting plate 160 gradually decrease from inside to outside. In this way, the disposition space of the strip-shaped ribs 161 may be reduced, to prevent the strip-shaped ribs 161 from occupying excessive space in the box assembly 100, and further facilitate mounting and disposition of the motor 200 and the transmission 400. On the other hand, the heights of the strip-shaped ribs 161 relative to the mounting plate 160 gradually decrease from inside to outside, and the center has a largest height, and may bear a high strength load formed by a bearing on the box assembly 100.

According to an embodiment of the present disclosure, the box assembly 100 includes a transmission box 101 and a motor box 102, the transmission box 101 includes a front box 180 and a rear box 190, the motor box 102 includes a motor housing 105 and a motor backend cover 150, the front box 180 and the motor housing 105 are disposed adjacent to each other, and the mounting plate 160 is constructed as a part of the front box 180 or a part of the motor housing 105. In this way, it is convenient for the electric assembly 1 to become a three-segment structure, forming of the transmission holding cavity 104 and the motor holding cavity 103 is facilitated, and mounting and dismounting of the electric assembly 1 are facilitated. Moreover, the mounting plate 160 is a part of the front box 180 or a part of the motor housing 105, and the mounting plate 160 is integrated on the box assembly 100, so that the structure of the box assembly 100 may be made more proper and compact, and the mounting plate 160 may be cooled by the lubricating liquid of the transmission 400, thereby improving the lubricating and cooling effect of the mounting plate 160.

Further, the front box 180 and the motor housing 105 are integrally formed or detachably connected. In this way, the electric assembly 1 may be a three-segment structure, to facilitate the disposition of the motor 200 and the transmission 400.

Figure 26:
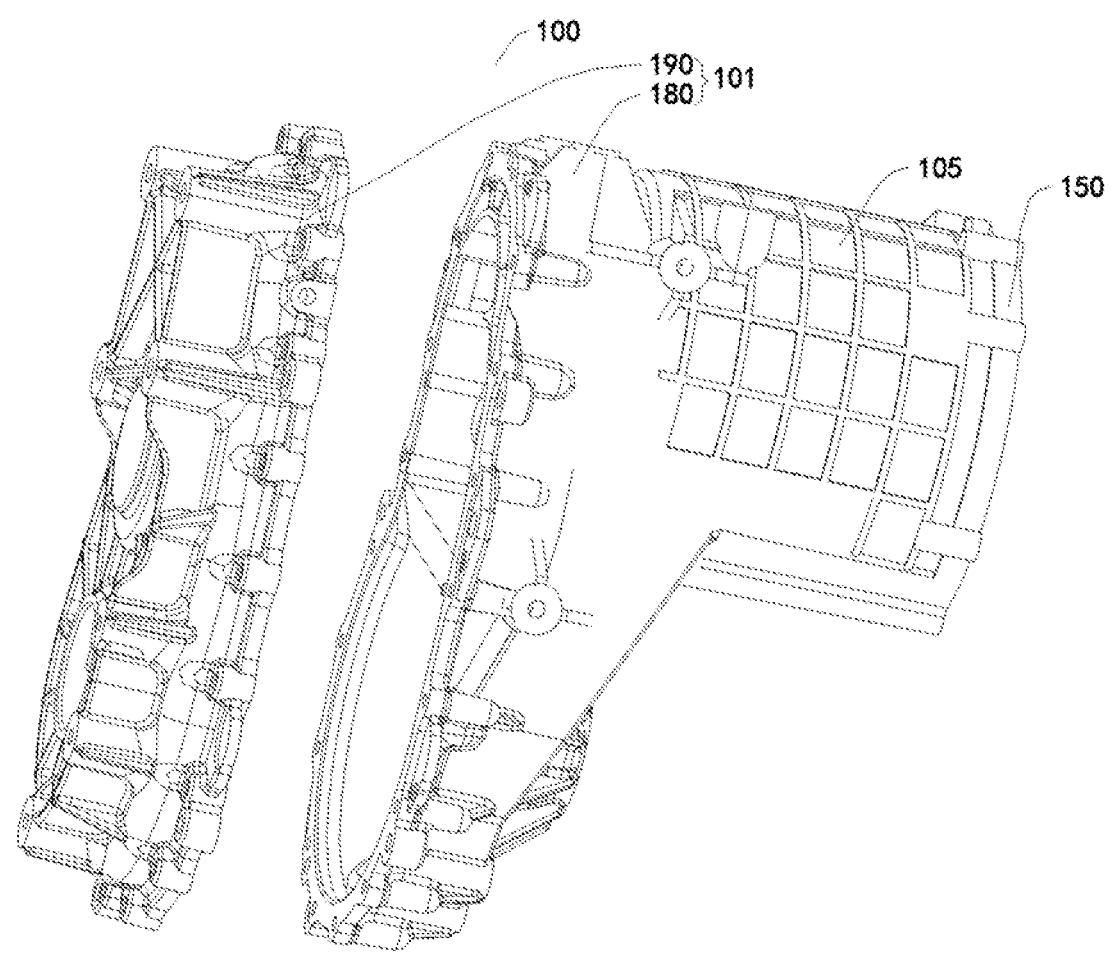
FIG. 26 is an exploded view of a box assembly of an electric assembly according to an embodiment of the present disclosure.

According to another embodiment of the present disclosure, as shown in FIG. 26 and FIG. 27, the box assembly 100 includes a transmission box 101 and a motor box 102, the transmission box 101 includes a front box 180 and a rear box 190, the motor box 102 includes a motor frontend cover 106, a motor housing 105 and a motor backend cover 150, and the mounting plate 160 is constructed as a part of the front box 180 or a part of the motor frontend cover 106. In this way, it is convenient for the electric assembly 1 to become a three-segment structure, forming of the transmission holding cavity 104 and the motor holding cavity 103 is facilitated, and mounting and dismounting of the electric assembly 1 are facilitated. Moreover, the mounting plate 160 is a part of the front box 180 or a part of the motor housing 105, and the mounting plate 160 is integrated on the box assembly 100, so that the structure of the box assembly 100 may be made more proper and compact, and the mounting plate 160 may be cooled by the lubricating liquid of the transmission 400, thereby improving the lubricating and cooling effect of the mounting plate 160.

According to an embodiment of the present disclosure, as shown in FIG. 23, the motor housing 105, the motor frontend cover 106 and the front box 180 are integrally formed or each two of the motor housing 105, the motor frontend cover 106 and the front box 180 are detachably connected. In this way, the structure flexibility of the box assembly may be improved, to facilitate optimization of the structure of the box assembly 100, facilitate reduction of the weight of the box assembly 100, and improve the endurance capability of the electric assembly 1.

According to another embodiment of the present disclosure, the motor frontend cover 106 and the front box 180 are integrally formed, and the motor housing 105 and the motor frontend cover 106 are detachably connected. In this way, simplification of the assembly process of the box assembly 100 is facilitated, thereby improving the assembly efficiency of the box assembly 100.

According to another embodiment of the present disclosure, the motor frontend cover 106 and the motor housing 105 are integrally formed, and the motor frontend cover 106 and the front box 180 are detachably connected. In this way, mutual separation between the transmission box 101 and motor box 102 is facilitated, to help improve the structure flexibility of the box assembly 100.

According to another embodiment of the present disclosure, the motor housing 105 is connected to the motor frontend cover 106 through a bolt, the motor frontend cover 106 is connected to the front box 180 through a bolt, and the motor housing 105 is connected to the motor backend cover 150 through a bolt. In this way, machining and forming of the motor housing 105, the motor frontend cover 106, the front box 180 and the rear box 190 are facilitated, so as to simplify the forming process. The motor housing 105 the front box 180 the rear box 190 the motor backend cover 150 the motor housing 105 the front box 180 the rear box 190 the motor backend cover 150 the motor housing 105 the front box 180 the motor housing 105. Because each of the motor frontend cover 106, the motor housing 105 and the motor backend cover 150 is detachable, the length of the motor 200 may be adjusted. For example, the length of the motor housing 105 as a standard member may be individually adjusted, thereby improving the structure flexibility and the application range of the motor 200.

Specifically, as shown in FIG. 27, one or more of a first connection rib 181, a second connection rib 182 and a third connection rib 183 are connected between an outer surface of the front box 180 and an outer surface of the motor housing 105, the first connection rib 181 is connected between an upper end face of the motor housing 105 and an upper end face of the front box 180, the second connection rib 182 is connected between a lower end face of the motor housing 105 and a lower end face of the front box 180, and the third connection rib 183 is located between the first connection rib 181 and the second connection rib 182. In this way, the strength of connection between the front box 180 and the motor housing 105 may be reinforced, to avoid a case in which a point with weak strength occurs in a connection location between the front box 180 and the motor housing 105 to cause deformation or damage, thereby improving the entire structure performance of the box assembly 100.

Figure 24:
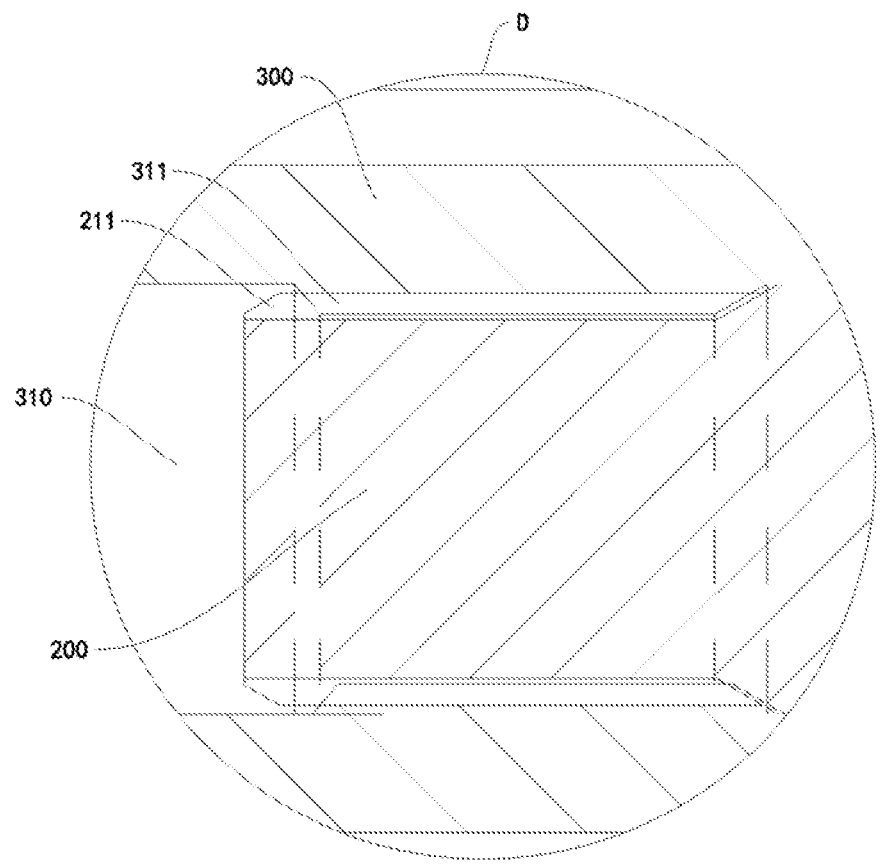
FIG. 24 is an enlarged diagram of a location D in FIG. 23.
Figure 25:
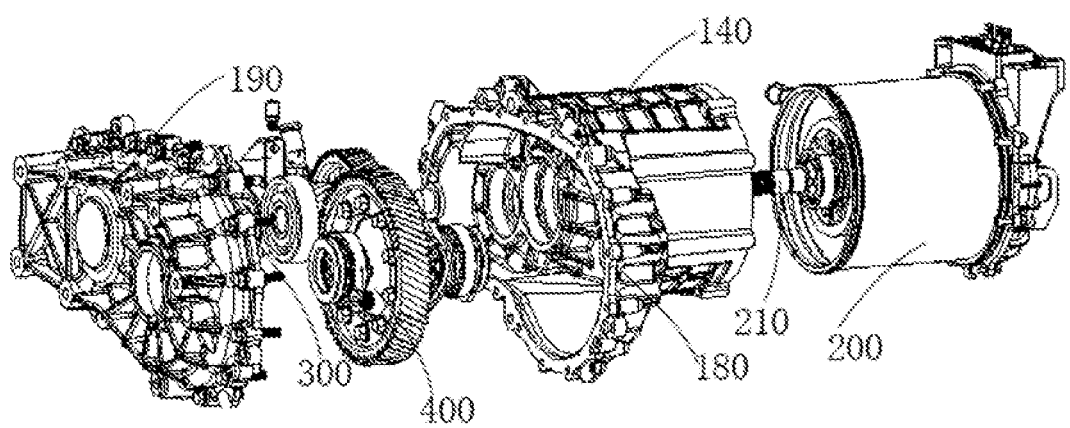
FIG. 25 is an exploded view of an electric assembly according to an embodiment of the present disclosure.

Optionally, as shown in FIG. 24, the transmission 400 includes a main shaft 300, the main shaft 300 is power-coupled to a motor shaft 210 of the motor 200, at least one of the motor shaft 210 and the main shaft 300 is threaded through a shaft via-hole 130 and is connected to the other one, and the main shaft 300 is connected to the motor shaft 210 of the motor 200 through splines. In this way, direct transmission between the motor shaft 210 and the main shaft 300 is facilitated, and an additional transmission structure may be left out, to further simplify the structure of the electric assembly 1, improve the integration level of the electric assembly 1, help transfer power outputted by the motor 200 to the transmission 400 in time, help improve the transmission efficiency of the electric assembly 1, and help improve timeliness and accuracy of power transmission of the electric assembly 1. In this way, the main shaft 300 and the motor shaft 210 may be fixed and positioned by using splines, to prevent relative rotation from occurring between the main shaft 300 and the motor shaft 210, facilitate reliable transmission of the electric assembly 1, and help ensure transmission efficiency of the electric assembly 1. In this way, another structure connecting the main shaft 300 and the motor shaft 210 may be left out, thereby further simplifying the structure of the electric assembly 1, and improving the integration level of the electric assembly 1, and because the main shaft 300 and the motor shaft 210 are sleeved over each other, the shaft spacing of the electric assembly 1 is further shortened, so as to further control the size of the electric assembly 1 in the axial direction of the motor shaft 210.

Further, as shown in FIG. 23, the main shaft 300 is provided with a shaft hole 310, an inner circumferential surface of the shaft hole 310 is provided with inner splines 311, an outer circumferential surface of the motor shaft 210 is provided with outer splines 211, the motor shaft 210 of the motor 200 is matched in the shaft hole 310 and the inner splines 311 match the outer splines 211. In this way, machining of the inner splines 311 is facilitated, to help improve machining precision of the inner splines 311. Through the matching between the inner splines 311 and the outer splines 211, transmission connection between the main shaft 300 and the motor shaft 210 may be implemented, and reliable positioning between the main shaft 300 and the motor shaft 210 may be implemented, to further prevent relative rotation from occurring between the main shaft 300 and the motor shaft 210. Moreover, the motor 200 is a three-segment motor, the main shaft 300 and the motor shaft 210 are sleeved over each other, and the length of the motor 200 may be adjusted according to a requirement, to help change torque and power of the motor 200, and help improve compatibility of the motor 200.

Specifically, the shaft hole 310 runs through the main shaft 300 along an axial direction of the main shaft 300, an oil baffle 320 is matched in the shaft hole 310, the oil baffle 320, an inner circumferential wall of the shaft hole 310 and the motor shaft 210 jointly define an oil storage cavity 330, the oil storage cavity 330 is filled with lubricating oil, and the oil baffle 320 is provided with an air vent 350. In this way, the disposition of the lubricating oil is facilitated, and the lubricating oil in the shaft hole 310 can be effectively prevented from leaking, to play a role of protecting a spline lubricating system. In this way, the main shaft 300 may have an oil storage function, the splines may be lubricated and cooled, the air vent 350 may discharge generated gas at the right time, and the disposition of the shaft hole 310 running through along the axial direction of the main shaft 300 may avoid a case in which gas exists in the shaft hole 310 to affect mounting of the motor shaft 210 and the main shaft 300.

More specifically, a seal retainer ring is matched between the oil baffle 320 and the shaft hole 310 and between the outer circumferential surface of the motor shaft 210 and the inner circumferential surface of the shaft hole 310. In this way, it is convenient to seal the oil storage cavity 330, and the lubricating oil in the oil storage cavity 330 may be prevented from leaking, thereby improving the seal effect of the oil storage cavity 330.

Optionally, as shown in FIG. 3, the electric assembly 1 further includes a plurality of bearings 800, and the plurality of bearings 800 are respectively sleeved over the motor shaft 210 and the main shaft 300 and are spaced apart along the axial direction of the motor shaft 210 and the main shaft 300. In this way, smooth rotation of the motor shaft 210 and the main shaft 300 is facilitated, to help improve reliability and accuracy of rotation of the motor shaft 210 and the main shaft 300.

Figure 8:
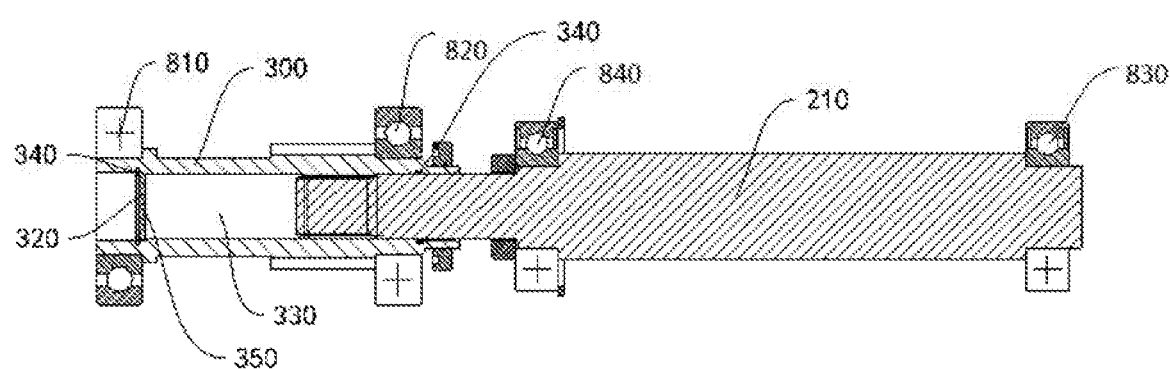
FIG. 8 is a local cross-sectional view of an electric assembly according to an embodiment of the present disclosure.

According to an embodiment of the present disclosure, as shown in FIG. 8, the plurality of bearings 300 include a first bearing 810, a second bearing 820 and a third bearing 830, the first bearing 810 and the second bearing 820 are respectively disposed adjacent to two ends of the main shaft 300, and the third bearing 830 is disposed adjacent to one end of the motor shaft 210 far away from the main shaft 300. In this way, the disposition of the motor shaft 210 and the main shaft 300 is facilitated, to further facilitate smooth rotation of the motor shaft 210 and the main shaft 300, and the quantity of the bearings may be reduced, to reduce costs of the electric assembly 1.

Specifically, the third bearing 830 is disposed between one end of the motor shaft 210 far away from the transmission 400 and the box assembly 100, the first bearing 810 is disposed between one end of the main shaft 300 far away from the motor 200 and the box assembly 100, and the second bearing 820 is disposed between at least one of one end of the motor 200 close to the main shaft 300 and one end of the main shaft 300 close to the motor shaft 210 and the box assembly 100. In this way, the force applied to the motor shaft 210 and the main shaft 300 may be more balanced, to help improve the operating performance of the electric assembly 1.

Optionally, the second bearing 820 is sleeved over the main shaft 300 and is located on an overlap between the main shaft 300 and the motor shaft 210 in the axial direction. In this way, the second bearing 820 may be used for supporting the main shaft 300 and the motor shaft 210, to ensure the disposition reliability of the main shaft 300 and the motor shaft 210. Because the overlap between the main shaft 300 and the motor shaft 210 in the axial direction is a place on which rotation forms stress concentration, effective supporting of the second bearing 820 may prevent the main shaft 300 and the motor shaft 210 from being broken, thereby improving the operating performance of the main shaft 300 and the motor shaft 210.

According to another embodiment of the present disclosure, as shown in FIG. 9, a fourth bearing 840 is further included, and the fourth bearing 840 is sleeved over the motor shaft and is located between the motor shaft and the motor housing. In this way, the fourth bearing 840 may be used for reinforcing supporting on the motor shaft 210, thereby further improving the disposition reliability of the motor shaft 210.

Specifically, the fourth bearing 840 is located between the main shaft 300 and a stator of the motor 200 in the axial direction of the motor shaft 210. In this way, the force applied to the main shaft 300 and the motor 200 may be more even, to help improve reliability and stability of power transfer between the main shaft 300 and the motor 200.

Optionally, as shown in FIG. 11, an outer surface of the motor housing 105 is provided with reinforcing ribs 141 arranged along the outer surface of the motor housing 105. In this way, it is convenient to improve the strength of the motor housing 105, and the surface area of the motor housing 105 may be increased, thereby improving the heat dissipation performance of the motor housing 105.

Figure 29:
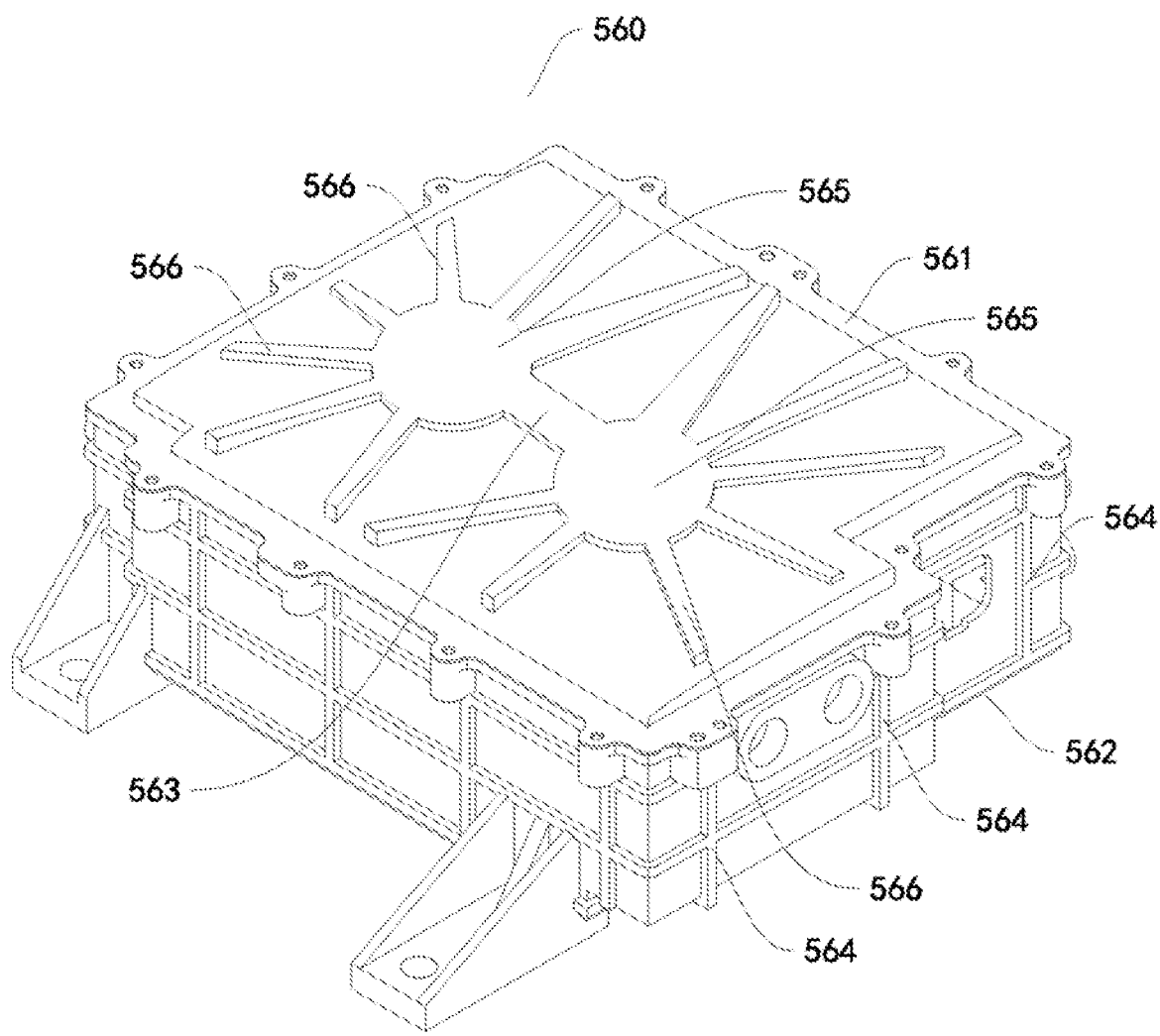
FIG. 29 is a schematic structural diagram of a housing of an electric assembly according to an embodiment of the present disclosure.
Figure 30:
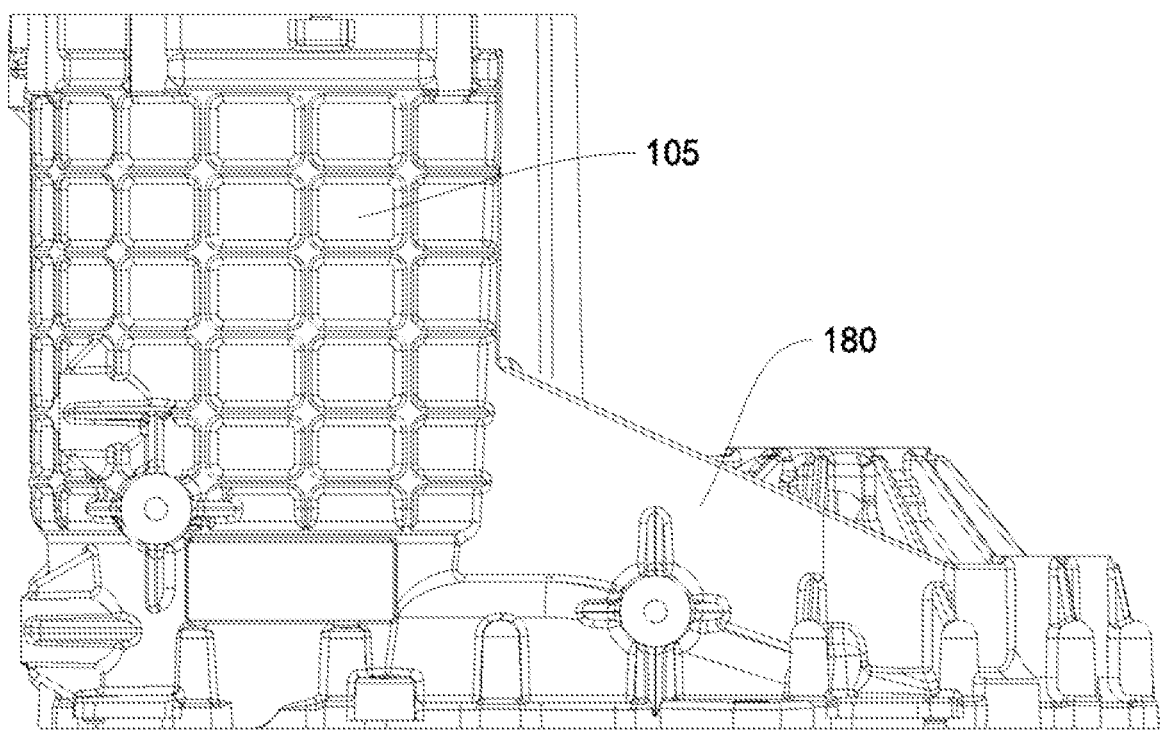
FIG. 30 is a schematic local structural diagram of an electric assembly according to another embodiment of the present disclosure.

Specifically, as shown in FIG. 29, the controller 500 has a housing 560, the housing 560 includes a cover plate 561 and a base 562, the cover plate 561 and the base 562 jointly define a cavity, and a surface of the cover plate 561 is provided with a protruding portion 563. Specifically, the inner and outer surfaces of the cover plate 561 may be each provided with a protruding portion. In this way, the disposition of the internal structure of the controller 500 is facilitated, and the protection for the internal structure of the controller 500 is facilitated.

Further, the protruding portion 563 is located in the center of the cover plate 561. In this way, it is convenient to improve the strength and rigidity in the center of the cover plate 561, thereby further improving the structure stability of the cover plate 561.

More specifically, as shown in FIG. 29, a surface of the cover plate 561 is provided with a plurality of cover plate reinforcing ribs 564, and each of the cover plate reinforcing ribs 564 extends to the periphery of the cover plate 561 along the center of the protruding portion 563. In this way, without increasing the wall thickness of the cover plate 561, the strength and rigidity of the cover plate 561 may be enhanced, so as to reduce the material use amount of the cover plate 561, help reduce the weight of the cover plate 561, and help reduce costs of the electric assembly 1.

Further, as shown in FIG. 29, bosses 565 are disposed in the centers of two opposite side edges of the protruding portion 563. In this way, the strength and rigidity of the cover plate 561 may be further enhanced, to facilitate assembly of the controller 500.

Furthermore, as shown in FIG. 29, there are a plurality of boss reinforcing ribs 566 on each of the bosses 565, and each of the boss reinforcing ribs 566 extends to the periphery of the cover plate along the center of the boss 565. In this way, the cover plate 561 may be prevented from being deformed, thereby improving the reliability and stability of the controller 500.

Optionally, a part of the transmission 400 is disposed in the front box 180. another part of the transmission 400 is disposed in the rear box 190. The motor backend cover 150 is detachably mounted on the motor housing 105. In this way, dismounting and mounting of the electric assembly 1 are facilitated, and maintenance of the electric assembly 1 is facilitated, thereby improving the maintenance efficiency of the electric assembly 1.

Further, an end face of the motor holding cavity 103 far away from one end of the transmission holding cavity 104 may be opened, and after the motor 200 is mounted to the box assembly 100, the motor backend cover 150 covers the motor holding cavity 103.

Optionally, the motor housing 105, the motor frontend cover 106, the motor backend cover 150, the cavity cover plate 620, and the controller 500 are mounted through bolts. In this way, reliability and stability of the fixed connection of the electric assembly 1 may be ensured, and when the electric assembly 1 has a fault, the electric assembly 1 may be quickly dismounted, to further facilitate maintenance of the electric assembly 1.

Specifically, the first bearing 810 is located on the end cover, the second bearing 820 and the fourth bearing 840 are respectively disposed at two ends of the shaft via-hole 130, and the third bearing 830 is located on an end face of the motor holding cavity 103 far away from the transmission holding cavity 104. In this way, the force applied to the main shaft 300 and the motor 200 may be more even, to further help improve the structure stability of the electric assembly 1.

More specifically, the main shaft 300 is provided with a first main shaft positioning slot and a second main shaft positioning slot, the first bearing 810 is matched in the first main shaft positioning slot, and the second bearing 820 is matched in the second main shaft positioning slot. The motor shaft 210 is provided with a third motor shaft positioning slot and a fourth motor shaft positioning slot, the third bearing 830 is matched in the third motor shaft positioning slot, and the fourth bearing 840 is matched in the fourth motor shaft positioning slot. The box assembly 100 is provided with box positioning slots matching the bearings 800. In this way, the positioning slots may be used for positioning the bearings 800, to facilitate reliable disposition of the bearings 800, and help improve location accuracy of the bearings 800.

Optionally, the electric assembly 1 can be directly mounted to the chassis of the vehicle 11 through a suspension mounting point on the box assembly 100. In this way, mounting of the electric assembly 1 is further facilitated, improvement of the mounting efficiency of the vehicle 11 is facilitated, and the mounting costs of the vehicle 11 are reduced.

Figure 7:
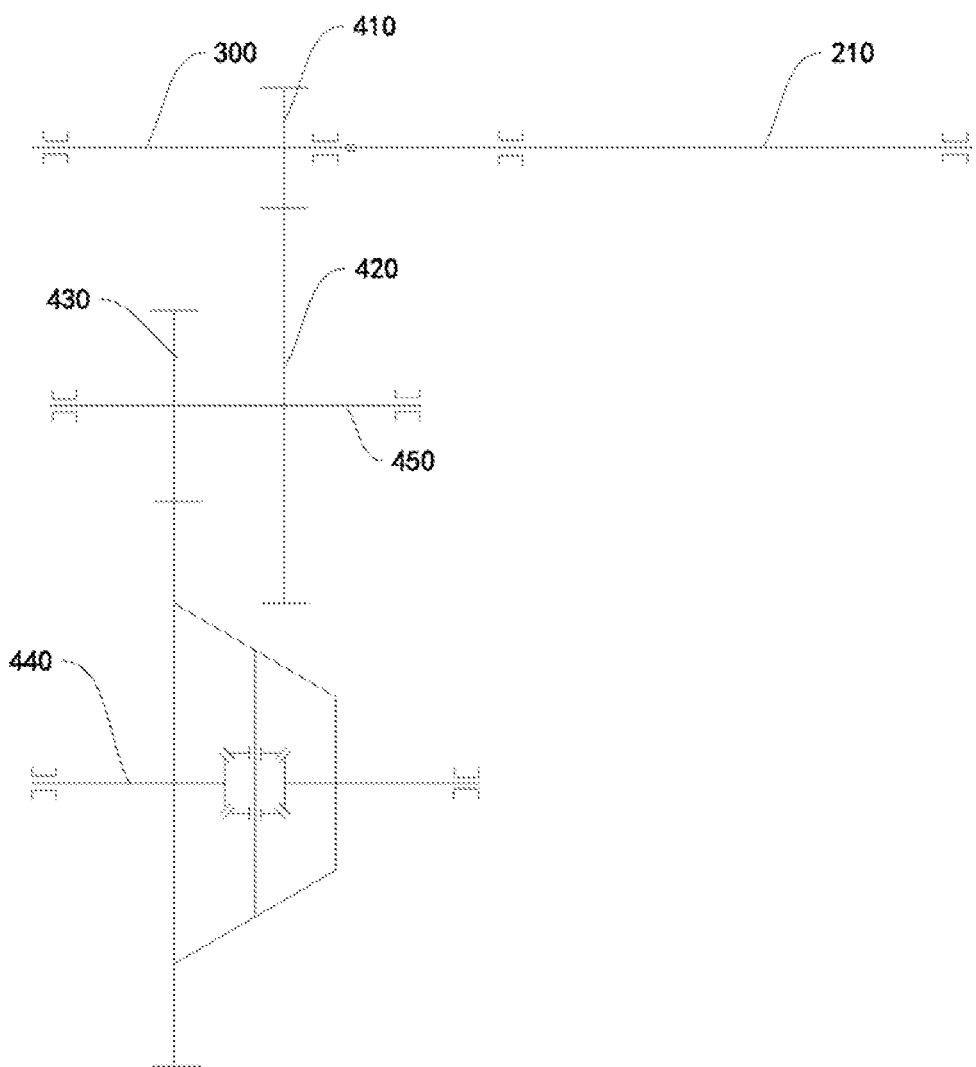
FIG. 7 is a schematic local structural diagram of an electric assembly according to an embodiment of the present disclosure.

Specifically, as shown in FIG. 7, the transmission 400 includes a differential assembly 440, a first gear 410, a second gear 420, a third gear 430 and a transmission shaft 450, the first gear 410 is sleeved over the main shaft 300, the second gear 420 and the third gear 430 are sleeved over the transmission shaft 450, the first gear 410 is meshed with the second gear 420, and the third gear 430 is meshed with the differential assembly 440. In this way, it is convenient for the transmission 400 to implement speed change transmission.

Optionally, the motor segment 110 is cylindrical, the speed change segment 120 protrudes outward from the outer circumferential surface of the motor segment 110, the motor holding cavity 103 is disposed on the motor segment 110, and the transmission holding cavity is disposed on the speed change segment 120. In this way, it is convenient for the box assembly 100 to protect the electric assembly 1.

Specifically, the axial line of the motor shaft 210 is parallel to those of the main shaft 300, the transmission shaft 450 and the differential assembly 440. In this way, it is convenient for the electric assembly 1 to smoothly transfer power.

A vehicle 11 according to an embodiment of the present disclosure is described below. The vehicle 11 according to one embodiment of the present disclosure includes the electric assembly 1 according to the foregoing embodiment of the present disclosure.

In the vehicle 11 according to one embodiment of the present disclosure, the electric assembly 1 according to the foregoing embodiment of the present disclosure is used, where the electric assembly has advantages such as a compact structure and a strong applicability.

Other configurations and operations of the vehicle 11 according to the embodiments of the present disclosure are known to those of ordinary skill in the art and will not be described in detail herein.

In the description of the present disclosure, it should be understood that, orientations or position relationships indicated by terms such as "center", "longitudinal", "transverse", "length", "width", "thickness", "up", "down", "front", "rear", "left", "right", "vertical", "horizontal", "top", "bottom", "inner", "outer", "clockwise", "counterclockwise", "axial", "radial", and "circumferential" are orientations or position relationship shown based on the accompanying drawings, and are merely used for describing the present disclosure and simplifying the description, rather than indicating or implying that the apparatus or element should have a particular orientation or be constructed and operated in a particular orientation, and therefore, should not be construed as a limitation on the present disclosure. Moreover, features modified by "first" and "second" may explicitly or implicitly include one or more features. In descriptions of the present disclosure, "a plurality of" means two or more, unless otherwise stated.

In the descriptions of the present disclosure, it should be noted that, unless otherwise clearly specified and defined, terms such as "mounting", "interconnection", and "connection" shall be understood in a broad sense, for example, may be a fixing connection, a detachable connection, an integral connection, a mechanical connection, an electrical connection, a direct connection, an indirect connection by using an intermediate medium, and communication between interiors of two components. A person of ordinary skill in the art may understand specific meanings of the foregoing terms in the present disclosure according to a specific situation.

In the descriptions of this specification, descriptions such as reference terms "an embodiment", "some embodiments", "exemplary embodiment", "example", "specific example", or "some examples" intend to indicate that specific features, structures, materials, or characteristics described with reference to embodiments or examples are included in at least one embodiment or example of the present disclosure. In this specification, exemplary descriptions of the foregoing terms do not necessarily refer to a same embodiment or example. In addition, the described specific feature, structure, material, or characteristic may be combined in a proper manner in any one or more embodiments or examples.

Although the embodiments of the present disclosure have been shown and described, a person skilled in the art can understand that the above embodiments cannot be construed to limit the present disclosure, and changes, alternatives, and modifications can be made in the embodiments without departing from the principle and the purpose of the present disclosure.

What is claimed is:

1. An electric assembly, comprising:
a box assembly;
a motor, wherein the motor is disposed in the box assembly;
a transmission, wherein the transmission is disposed in the box assembly, and the transmission is power-coupled to the motor; and
a controller, wherein the controller is disposed outside the box assembly and fixedly connected to the box assembly,
wherein the electric assembly further comprises a conductive sheet, the conductive sheet is configured to conductively connect the controller and the motor, and the conductive sheet is stuck in the controller or the conductive sheet is fixed to the controller through a bolt.

2. The electric assembly according to claim 1, wherein the controller is located above the box assembly,
a height-to-width ratio of the electric assembly ranges from 0.6 to 0.9, and
an upper surface of the box assembly is in contact with a lower surface of the controller, and the lower surface of the controller is fixed onto the box assembly through a bolt.

3. The electric assembly according to claim 1, wherein the transmission and the motor jointly define a folded space.

4. The electric assembly according to claim 1, wherein
a mounting plate is disposed in the box assembly,
the mounting plate divides a space within the box assembly into a motor holding cavity and a transmission holding cavity that are arranged along an axial direction of a motor shaft,
the mounting plate has a shaft via-hole making the motor holding cavity and the transmission holding cavity in communication with each other, and
the motor is power-coupled to the transmission.

5. The electric assembly according to claim 4, wherein a side of the mounting plate facing the motor is provided with ribs, and
the ribs divide a space between the mounting plate and the motor into a plurality of cavities.

6. The electric assembly according to claim 5, wherein the ribs comprise an annular rib extending along a circumferential direction of the motor.

7. The electric assembly according to claim 4, wherein a maximum distance between the motor and the mounting plate is less than a preset distance.

8. The electric assembly according to claim 1, wherein
the box assembly comprises a transmission box and a motor box,
the transmission box comprises a front box and a rear box,
the motor box comprises a motor housing and a motor backend cover, the front box and the motor housing are disposed adjacent to each other, and
the mounting plate is constructed as a part of the front box or a part of the motor housing.

9. The electric assembly according to claim 8, wherein one or more of a first connection rib, a second connection rib and a third connection rib are connected between an outer surface of the front box and an outer surface of the motor housing, the first connection rib is connected between an upper end face of the motor housing and an upper end face of the front box, the second connection rib is connected between a lower end face of the motor housing and a lower end face of the front box, and the third connection rib is located between the first connection rib and the second connection rib.

10. The electric assembly according to claim 1, wherein
the box assembly comprises a transmission box and a motor box,
the transmission box comprises a front box and a rear box,
the motor box comprises a motor frontend cover, a motor housing, and a motor backend cover, and
the mounting plate is constructed as a part of the front box or a part of the motor frontend cover.

11. The electric assembly according to claim 10, wherein the motor housing, the motor frontend cover and the front box are integrally formed or each two of the motor housing, the motor frontend cover and the front box are detachably connected.

12. The electric assembly according to claim 10, wherein the motor frontend cover and the front box are integrally formed, and the motor housing and the motor frontend cover are detachably connected.

13. The electric assembly according to claim 10, wherein the motor frontend cover and the motor housing are integrally formed, and the motor frontend cover and the front box are detachably connected.

14. An electric assembly, comprising:
a box assembly;
a motor, wherein the motor is disposed in the box assembly;
a transmission, wherein the transmission is disposed in the box assembly, and the transmission is power-coupled to the motor; and
a controller, wherein the controller is disposed outside the box assembly and fixedly connected to the box assembly,
wherein
the controller has a housing,
the housing comprises a cover plate and a base, the cover plate and the base jointly define a cavity, and
a surface of the cover plate is provided with a protruding portion,
wherein bosses are disposed in the centers of two opposite side edges of the protruding portion, there are a plurality of boss reinforcing ribs on each of the bosses, and each of the boss reinforcing ribs extends to the periphery of the cover plate along the center of the boss.

15. The electric assembly according to claim 14, wherein the protruding portion is located in the center of the cover plate.

16. The electric assembly according to claim 14, wherein
a surface of the cover plate is provided with a plurality of cover plate reinforcing ribs, and
each of the cover plate reinforcing ribs extends to the periphery of the cover plate along the center of the protruding portion.

17. An electric assembly, comprising:
a box assembly;
a motor, wherein the motor is disposed in the box assembly;
a transmission, wherein the transmission is disposed in the box assembly, and the transmission is power-coupled to the motor; and
a controller, wherein the controller is disposed outside the box assembly and fixedly connected to the box assembly,
wherein a mounting plate is disposed in the box assembly, the mounting plate divides a space within the box assembly into a motor holding cavity and a transmission holding cavity that are arranged along an axial direction of a motor shaft, the mounting plate has a shaft via-hole making the motor holding cavity and the transmission holding cavity in communication with each other, and the motor is power-coupled to the transmission,
wherein a side of the mounting plate facing the motor is provided with ribs, and the ribs divide a space between the mounting plate and the motor into a plurality of cavities, and
wherein
the ribs comprise strip-shaped ribs extending along a radial direction of the motor,
there are a plurality of strip-shaped ribs and the plurality of strip-shaped ribs are spaced apart along a circumferential direction of the mounting plate, and
heights of the strip-shaped ribs relative to the mounting plate gradually decrease from inside to outside.

* * * * *